US011258840B2

(12) United States Patent
Papalini et al.

(10) Patent No.: US 11,258,840 B2
(45) Date of Patent: Feb. 22, 2022

(54) REALTIME COMMUNICATION ARCHITECTURE OVER HYBRID ICN AND REALTIME INFORMATION CENTRIC TRANSPORT PROTOCOL

(71) Applicant: Cisco Technology, Inc., San Jose, CA (US)

(72) Inventors: Michele Papalini, Issy les Moulineaux (FR); Giovanna Carofiglio, Paris (FR); Luca Muscariello, Paris (FR); Alberto Compagno, Issy les Moulineaux (FR)

(73) Assignee: CISCO TECHNOLOGY, INC, San Jose, CA (US)

(*) Notice: Subject to any disclaimer, the term of this patent is extended or adjusted under 35 U.S.C. 154(b) by 8 days.

(21) Appl. No.: 16/405,144

(22) Filed: May 7, 2019

(65) Prior Publication Data

US 2020/0204605 A1   Jun. 25, 2020

Related U.S. Application Data

(60) Provisional application No. 62/782,462, filed on Dec. 20, 2018.

(51) Int. Cl.
*H04L 29/06* (2006.01)
*H04L 29/08* (2006.01)
(Continued)

(52) U.S. Cl.
CPC ........ *H04L 65/608* (2013.01); *G06F 16/2365* (2019.01); *H04L 1/0067* (2013.01);
(Continued)

(58) Field of Classification Search
CPC ..... H04L 65/608; H04L 65/80; H04L 65/403; H04L 67/32; H04L 69/162; H04L 69/166;
(Continued)

(56) References Cited

U.S. PATENT DOCUMENTS 9,282,133 B2   3/2016   Tsyganok et al.
9,838,333 B2   12/2017   Ravindran et al.
(Continued)

OTHER PUBLICATIONS

A. M. Malik et al., "Experiences from a field test using ICN for live video streaming," 2015 IEEE International Conference on Multimedia & Expo Workshops (ICMEW), Turin, Italy, 2015, pp. 1-6, doi: 10.1109/ICMEW.2015.7169800. (Year: 2015).*

(Continued)

*Primary Examiner* — Philip J Chea
*Assistant Examiner* — Ruth Solomon
(74) *Attorney, Agent, or Firm* — Edell, Shapiro & Finnan, LLC

(57) ABSTRACT

A network device is configured to distribute audio streams and video streams among participant devices connected to the network device over a communication network. The network device collects respective audio streams from the participant devices, and ranks the participant devices based on the respective audio streams collected from the participant devices. Based on the ranking, the network device elects top-N participant devices among the participant devices as being associated with respective users who are active speakers, where N is one or more, and retrieves respective video streams only from the top-N participant devices. The network device receives from the participant devices respective requests for video streams from the top-N participant devices, and sends to the participant devices the video streams retrieved only from the top-N participant devices.

20 Claims, 16 Drawing Sheets

(51) Int. Cl.

| | | |
|---|---|---|
| *G06F 16/23* | (2019.01) | |
| *H04L 1/00* | (2006.01) | |
| *G06F 16/958* | (2019.01) | |
| *H04L 65/65* | (2022.01) | |
| *H04L 65/403* | (2022.01) | |
| *H04L 65/80* | (2022.01) | |
| *H04L 69/166* | (2022.01) | |
| *H04L 67/60* | (2022.01) | |
| *H04L 69/16* | (2022.01) | |
| *H04L 65/60* | (2022.01) | |
| *H04L 65/612* | (2022.01) | |

(52) U.S. Cl.
CPC ............ *H04L 65/403* (2013.01); *H04L 65/80* (2013.01); *H04L 67/32* (2013.01); *H04L 69/162* (2013.01); *H04L 69/166* (2013.01); *G06F 16/972* (2019.01); *H04L 65/4084* (2013.01); *H04L 65/602* (2013.01)

(58) Field of Classification Search
CPC . H04L 1/0067; H04L 65/4084; H04L 65/602; G06F 16/2365; G06F 16/23; G06F 16/972
See application file for complete search history.

(56) References Cited

U.S. PATENT DOCUMENTS

| | | | |
|---|---|---|---|
| 10,063,488 B2* | 8/2018 | Oran | H04L 43/0852 |
| 10,104,633 B1* | 10/2018 | Azgin | H04W 64/00 |
| 2007/0097987 A1 | 5/2007 | Rey et al. | |
| 2012/0008681 A1 | 1/2012 | Lundin | |
| 2013/0060962 A1 | 3/2013 | Wang et al. | |
| 2013/0063542 A1 | 3/2013 | Bhat et al. | |
| 2014/0372941 A1 | 12/2014 | Parsons et al. | |
| 2015/0058413 A1 | 2/2015 | Ge | |
| 2017/0034055 A1* | 2/2017 | Ravindran | H04L 45/306 |
| 2017/0155870 A1* | 6/2017 | Zetterlund | H04N 7/15 |
| 2017/0177482 A1 | 6/2017 | Greenspan | |
| 2017/0195375 A1* | 7/2017 | Thubert | H04L 65/1069 |
| 2017/0279728 A1* | 9/2017 | Oran | H04L 47/12 |
| 2017/0324662 A1* | 11/2017 | Holmberg | H04L 45/748 |
| 2018/0146160 A1 | 5/2018 | Kang et al. | |
| 2018/0159915 A1 | 6/2018 | Westphal et al. | |
| 2018/0227390 A1 | 8/2018 | Reznik et al. | |
| 2018/0241669 A1 | 8/2018 | Muscariello et al. | |
| 2018/0287940 A1 | 10/2018 | Westphal | |
| 2018/0288726 A1* | 10/2018 | Azgin | H04L 43/0864 |
| 2019/0089643 A1 | 3/2019 | Westphal et al. | |
| 2019/0089811 A1 | 3/2019 | White et al. | |
| 2019/0089967 A1* | 3/2019 | White | H04N 19/39 |
| 2019/0158622 A1 | 5/2019 | Balakrishnan et al. | |
| 2019/0163752 A1* | 5/2019 | Barlaskar | G06F 16/437 |
| 2019/0327169 A1 | 10/2019 | Alam et al. | |
| 2019/0364078 A1* | 11/2019 | Thubert | H04L 65/1069 |
| 2020/0204605 A1 | 6/2020 | Papalini et al. | |

OTHER PUBLICATIONS

S. Mastorakis, P. Gusev, A. Afanasyev and L. Zhang, "Real-Time Data Retrieval in Named Data Networking," 2018 1st IEEE International Conference on Hot Information-Centric Networking (HotICN), 2018, pp. 61-66, doi: 10.1109/HOTICN.2018.8605992. ( Year: 2018).*

Jitsi, "Jitsi.org—develop and deploy full-featured video conferencing," retrieved from https://jitsi.org/, on May 6, 2019, 4 pages.

Github, "jitsi/jitsi-meet-torture," retrieved from https://github.com/jitsi/jitsi-meet-torture/, on May 6, 2019, 3 pages.

Linux Containers, "Linux Containers—Infrastructure for container projects," retrieved from https://linuxcontainers.org/, May 6, 2019, 2 pages.

Selenium, "Selenium—Web Browser Automation," retrieved from https://docs.seleniumhq.org/, on May 6, 2019, 3 pages.

Carofiglio, et al., "Optimal Multipath Congestion Control and Request Forwarding in Information-Centric Networks," 2013 21st IEEE International Conference on Network Protocols (ICNP), Oct. 2013, 10 pages.

Carofiglio, et al., "Leveraging ICN In-network Control for Loss Detection and Recovery in Wireless Mobile networks," ICN'16, Sep. 2016, 10 pages.

Chakraborti, et al., "ICN based Scalable Audio-Video Conferencing on Virtualized Service Edge Router (VSER) Platform," ICN'15, Sep. 30-Oct. 2, 2015, 2 pages.

Linux Foundation, "Cicn," retrieved from https://wiki.fd.io/view/Cicn, on May 6, 2015, 5 pages.

The Linux Foundation, "networking:netem [Wiki]," retrieved from https://wiki.linuxfoundation.org/networking/netem, on May 6, 2019, 7 pages.

Git At Google, "webrtc Git repositories," retrieved from https://webrtc.googlesource.com/, on May 6, 2019, 1 page.

Grozev, et al., "Last N: Relevance-Based Selectivity for Forwarding Video in Multimedia Conferences," NOSSDAV'15, Mar. 2015, 6 pages.

Grozev, et al., "Experimental Evaluation of Simulcast for WebRTC," IEEE Communications Standards Magazine, Jun. 2017, 8 pages.

Gusev, et al. "NDN-RTC: Real-Time Videoconferencing over Named Data Networking," ICN'15, Sep. 30-Oct. 2, 2015, 10 pages.

Ivov, et al., "A Real-time Transport Protocol (RTP) Header Extension for Mixer-to-Client Audio Level Indication," Internet Engineering Task Force (IETF), Request for Comments: 6465, Standards Track, Dec. 2011, 15 pages.

Jacobson, et al., "VoCCN: Voice-over Content-Centric Networks," ReArch'09, Dec. 2009, 6 pages.

Jacobson, et al., "Networking Named Content," CoNEXT'09, Dec. 2009, 12 pages.

Jangam, et al., "Realtime Multi-party Video Conferencing Service over Information Centric Network," 2015 IEEE International Conference on Multimedia & Expo Workshops (ICMEW), Jul. 2015, 6 pages.

Linux Foundation, "FD.io—Vector Packet Processing—One Terabit Software Router," retrieved from https://fd.io/wp-content/uploads/sites/34/2017/07/FDioVPPwhitepaperJuly2017.pdf, on May 6, 2019, 21 pages.

Mosko, et al., "CCNx Semantics," draft-irtf-icnrg-ccnxsemantics-09, ICNRG, Internet—Draft, Experimental, Jun. 26, 2018, 35 pages.

Muscariello, et al., "Hybrid Information-Centric Networking," draft-muscariello-intarea-hicn-01, Internet Area WG, Internet—Draft, Informational, Dec. 4, 2018, 22 pages.

Ott, et al., "Extended RTP Profile for Real-time Transport Control Protocol (RTCP)-Based Feedback (RTP/AVPF)," Network Working Group, Request for Comments: 4585, Standards Track, Jul. 2006, 51 pages.

Petrangeli, et al., "Dynamic Video Bitrate Adaptation for WebRTC-Based Remote Teaching Applications," 2018 IEEE/IFIP Network Operations and Management Symposium, NOMS 2018, Apr. 2018, 5 pages.

Petrangeli, et al., "Improving Quality and Scalability of WebRTC Video Collaboration Applications," MMSys'18: 9th ACM Multimedia Systems Conference, Jun. 2018, 4 pages.

Rodriquez, et al., "Materialising a new architecture for a distributed MCU in the Cloud," Computer Standards & Interfaces 44, Feb. 2016, 3 pages.

Samain, et al., "Dynamic Adaptive Video Streaming: Towards a Systematic Comparison of ICN and TCP/IP," IEEE Transactions On Multimedia, vol. 19, No. 10, Oct. 2017, 16 pages.

Sardara, et al., "A Transport Layer and Socket API for (h)ICN: Design, Implementation and Performance Analysis," ICN '18, Sep. 2018, 11 pages.

Sasson, "How vidyo.io delivers massive scalability while maintaining reliability and quality through cascading SFUs," Dec. 5, 2017, retrieved from https://vidyo.io/blog/features/vidyo-io-delivers-massive-scalability-maintaining-reliability-quality-cascading-sfus/, 7 pages.

(56) References Cited

OTHER PUBLICATIONS

Zhang, et al., "Demo: VR Video Conferencing over Named Data Networks," ICN '17, Sep. 2017, 2 pages.

Zhu, et al., "ACT: Audio Conference Tool Over Named Data Networking," ICN'11, Aug. 2011, 6 pages.

Pentikousis Ed., Kostas, et al. "Information-Centric Networking: Baseline Scenarios." Internet Research Task Force (IRTF), RFC 7476, Mar. 2015, 46 pages; http://www.hjp.at/doc/rfc/rfc7476.html.

IRTF, "Information-Centric Networking Research Group (ICNRG)", https://trac.ietf.org/trac/irtf/wiki/icnrg, Mar. 3, 2020 5 pages.

fd.io, "HICN", https://wiki.fd.io/index.php?title=HICN&oldid=10422, Feb. 28, 2020, 4 pages.

Named Data Networking, "Named Data Networking (NDN)—A Future Internet Architecture", https://named-data.net/, Mar. 3, 2020, 11 pages.

Wei, Jun et al., "Experience with Collaborative Conferencing Applications in Named-Data Networks", The 10th Annual IEEE CCNC—Multimedia Networking & Services & Applications, Jan. 11, 2013, pp. 241-246.

Ravindran, et al., "Towards Software Defined ICN based Edge-Cloud Services," 2013 IEEE 2nd International Conference on Cloud Networking (CloudNet): Industry—Track Paper, Nov. 11, 2013, pp. 237-235.

Gusev, Peter et al., "NDN-RTC: Real-time videoconferencing over Named Data Networking", Named Data Networking Technical Report NDN-0033, Revision 1: Jul. 2, 2015, 11 pages.

\* cited by examiner

REALTIME COMMUNICATION ARCHITECTURE OVER HYBRID ICN AND REALTIME INFORMATION CENTRIC TRANSPORT PROTOCOL

PRIORITY CLAIM

This application claims priority to U.S. Provisional Application No. 62/782,462, filed Dec. 20, 2018, the entirety of which is incorporated herein by reference.

TECHNICAL FIELD

The present disclosure relates to realtime communications over a hybrid Information Centric Networking (ICN) (hICN) network and related protocols

BACKGROUND

In the quest for ultra low-latency media streaming, Web Real-Time Communications (WebRTC) emerges as a promising option when compared to HyperText Transfer Protocol (HTTP) live streaming technologies such as HTTP Live Streaming (HLS) or the Moving Picture Experts Group (MPEG) Dynamic Adaptive Streaming over HTTP (MPEG/DASH), which fail to go below the few second timescale imposed by the chunk granularity. However, unlike modern Content Delivery Networks (CDNs), the WebRTC distribution model is not designed for large scale use because its scalability is limited.

A pull-based communication paradigm such as provided by hybrid Information Centric Networking (ICN) (hICN) may introduce problems in realtime communications for the following reasons: (i) consumers may suffer additional latency since a full round-trip time (RTT) elapses between the sending of an Interest and the reception of the corresponding data; and (ii) consumers need to know what data to request, e.g., they need to know the segment number of data newly generated by a producer.

DESCRIPTION OF EXAMPLE EMBODIMENTS

Overview

A network device is configured to distribute audio streams and video streams among participant devices connected to the network device over a communication network. The network device collects respective audio streams from the participant devices, and ranks the participant devices based on the respective audio streams collected from the participant devices. Based on the ranking, the network device elects top-N participant devices among the participant devices as being associated with respective users who are active speakers, where N is one or more, and retrieves respective video streams only from the top-N participant devices. The network device receives from the participant devices respective requests for video streams from the top-N participant devices, and sends to the participant devices the video streams retrieved only from the top-N participant devices.

EXAMPLE EMBODIMENTS

Hybrid Information Centric Networking (hICN)

Hybrid Information-Centric Networking (hICN) extends the Internet Protocol (IP) to allow named-data communications, where content is a first class citizen and routing is based on location-independent names. Routing on location-independent names have been realized in Content Centric Networking (CCN) protocols. hICN makes it possible in IP, both v4 and v6, by overloading the semantics of a few header fields in the IP packets as described below. In particular, hICN (i) does not sacrifice any of the ICN features, (ii) transparently interconnects hICN routers with IP routers that are able to process hICN packets as standard packets, and (iii) can be implemented by reusing most existing software, minimizing modifications required to existing networks and applications.

As an implementation of the ICN architecture, hICN inherits the ICN pull-based request/reply protocol semantics: to retrieve a piece of information a user request it, using an Interest packet (simply, "Interest"); the reply is carried inside a data packet as a payload.

The hICN architecture comprises a network layer (L3) and a transport layer (L4) and provides service access points to content producers and content consumers to produce and consume named resources, respectively. This is done using an hICN socket application programming interface (API) described below.

Naming for Interest and Data Packets

Figure 1:
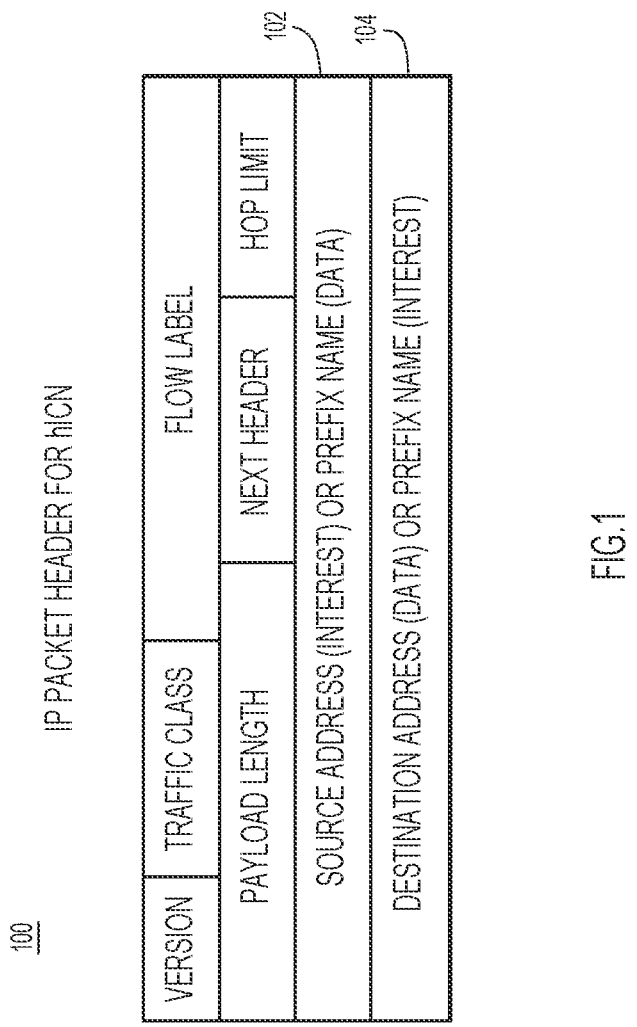
FIG. 1 is an illustration of a modified Internet Protocol (IP) packet header for an Interest and a data packet for hybrid Information Centric Networking (ICN) (hICN), according to an example embodiment.

Resource names may be encoded as 128 (or 32 bits) numbers and can be represented using the common hexadecimal or dotted decimal notation for v6 or v4 addresses, respectively, e.g. FE80:CD00::211E:729C or 192.168.1.1. hICN envisages the creation of a new address family AF_HICN to encode resource names. These names are referred to as network names or name_prefixes. The name_prefixes are stored in an IP packet header modified for hICN. In particular, in a data packet the name_prefixes may be stored in the IP source address, while in an Interest packet it may be stored in the IP destination field. The modifications to the IP header (IPv6 in this example) packet are shown in FIG. 1. With reference to FIG. 1, there is an illustration of example modified IP packet header 100 for an Interest and a data packet in hICN. For the Interest, header 100 includes a name_prefix for data requested by the Interest in a source address field 102. For the data packet responsive to the Interest, header 100 includes a name_prefix for the data requested by the Interest in a destination address field 104. Header 100 also includes typical IP fields version, traffic class, flow label, payload length, next header, and hop limit.

Figure 2:
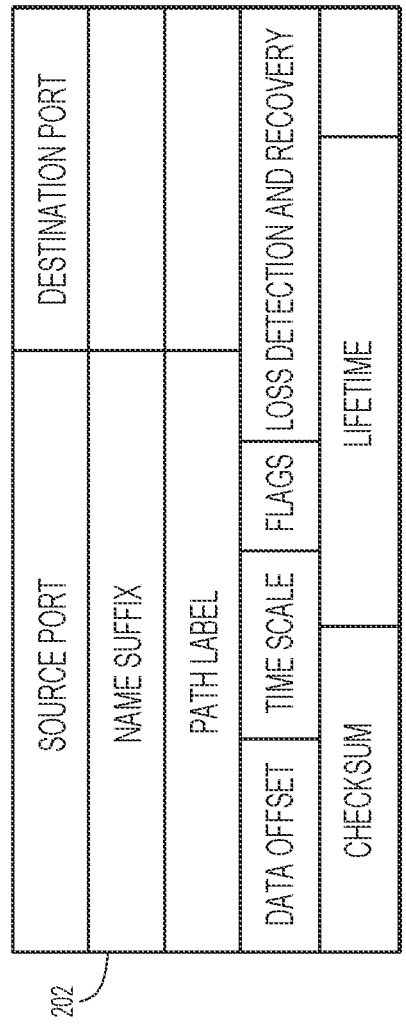
FIG. 2 is an illustration of a modified Transmission Control Protocol (TCP) header for hICN, according to an example embodiment.

The transport layer takes care of segmentation and reassembly of upper layer protocol data units, with optional signing operations. The full data packet name is obtained by appending the segmentation information, namely name_suffix, to the name_prefix. The name_suffix, along with other transport layer information, is carried in a TCP-like header, as show in FIG. 2. With reference to FIG. 2, there is an illustration of an example TCP header 200 modified for hICN. Header 200 includes name_suffix 202, in addition to typical TCP fields, such as source and destination ports, lifetime, and checksum.

For the sake of clarity, in the ensuing description, human readable names are used instead of IP addresses. Each name includes a name_prefix and a name_suffix. The name_prefix includes a set of name components, e.g., "/video/participant/" where "/" is a separator between name components. An example, name_suffix is indicated as "seg=x".

Forwarding of Interests and Data Packets

Figure 3:
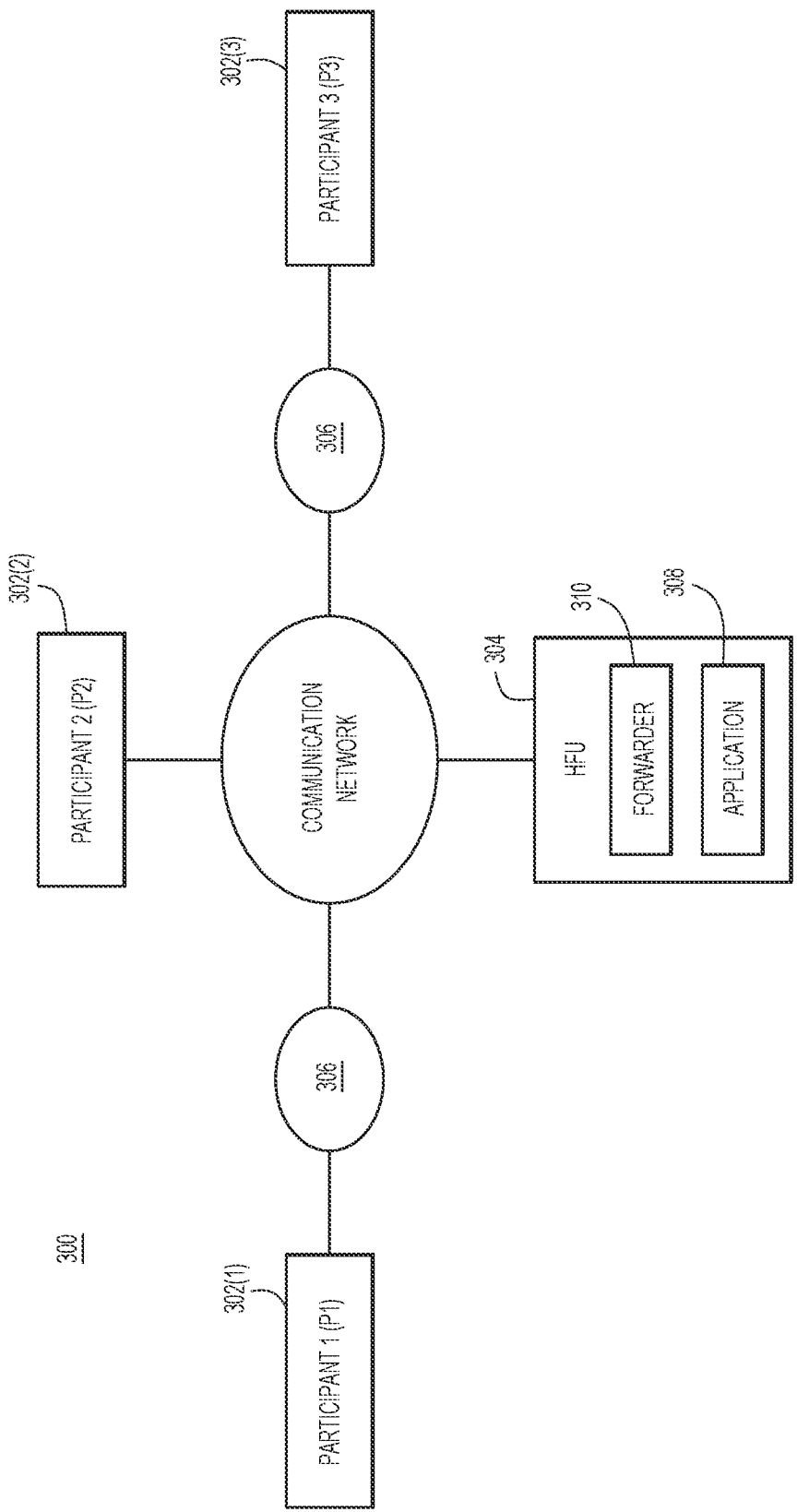
FIG. 3 is an illustration of a selective forwarding unit (SFU)-based (network) architecture in which hICN-Real-Time Communication (RTC) (hICN-RTC) embodiments may be implemented, according to an example embodiment

Interest and data packets follow a different forwarding path inside an hICN forwarder (described below in connection with FIG. 3). From a high level standpoint, Interests are forwarded using routing by name while data packets are label switched, similarly to IP packets. As in ICN, an hICN router has a memory to store (i) pending Interests, meaning Interest packets that were forwarded by a router but not yet satisfied, and (ii) data packets that can be used to reply to future Interests. This memory is called a "packet cache" and replaces the Pending Interest Table (PIT) and Content Store (CS) of ICN forwarders. The packet cache is indexed by the full packet name (which is the concatenation of the prefix and the suffix portions of the name) and uses different insertion/eviction policies for Interest and data.

Packet classification and punting: Before explaining forwarding procedures, an explanation of how an hICN router can classify a packet in order to process it in the correct way is provided. In particular the router distinguishes between data, Interest, and a standard IP packet. hICN routers use the Access Control List (ACL) functionality generally available on standard IP routers to classify the packets by using source (src) and destination (dst) address fields: (i) if only src belongs to AF_HICN the packet is data, (ii) if only dst belongs to AF_HICN, the packet is an Interest, (iii) if none of the two fields belong to AF_HICN, the packet is processed as a regular IP packet, and (iv) the packet is dropped since it is an invalid packet. Once the packet is classified it is punted to the right forwarding pipeline.

Interest forwarding: The pseudo code for forwarding Interests is shown below in Algorithm 1.

---

Algorithm 1: Interest Forwarding
Function DataHit( )
    cachedData.dst = Interest.src; // dst addr translation
    TX(cachedData,Interest.inFace); Drop (Interest);
Function InterestHit( )
    if Interest.src == cachedInterest.src then
        manageDuplicate(Interest);
    else
        storeInCache(Interest, Interest.inFace);
        manageAggregation(Interest);
Function NoHit( )
    availableFaces = LPM(FIB, Interest);
    outFaces = forwardingStrategy(availableFaces);
    for face ∈ outFaces do
        Interest.src = face.address; // src addr translation
        TX(Interest, face);
    storeInCache(Interest);

---

Traversing the pseudo code of Algorithm 1, at reception of an Interest packet at a router, an exact match lookup on the full name is performed in the packet cache to locate a matching packet. In case of DataHit, meaning that the packet cache returns a matching data packet, the router directly satisfies the Interest, without sending it upstream. The destination address of the matching data packet is rewritten with the source address carried in the Interest packet and forwarded from the incoming interface of the Interest. Notice that source address of the Interest is a valid IP address that indicates the previous hICN-hop traversed by the Interest packet. This address translation guarantees path symmetry at the hICN level; however, data packets will not necessarily follow the reverse path of the Interest when traversing IP networks.

If the packet cache returns a matching Interest (InterestHit), the pipeline compares the source address of the received Interest with the source address of matching one. If the two addresses are the same, the incoming Interest is a duplicate, otherwise is a request coming from a new source. One way to handle this is to forward only one request for the same content upstream, minimizing the traffic.

Finally, in case of NoHit, the Interest packet is passed to the IP FIB lookup stage to determine the set of available next hop options. This stage makes use of the existing IP FIB lookup engine, with one exception that hICN returns all the available output faces. The result is passed to the forwarding strategy that decides which face (or faces) to use to forward the Interest according to some metrics that can be programmed. The Interest is also stored in the packet cache to allow for aggregation of future Interests.

Data packet forwarding: The pseudo code for forwarding data packets is presented below in Algorithm 2.

```
Algorithm 2: Data Forwarding
Function InterestHit( )
    for Interest cachedInterest do
        data.dst = Interest.src // dst addr translation TX(data,
        getInface(Interest)); evict(Interest);
    storeInCache(data);
```

When a data packet arrives at the hICN forwarder, an exact match lookup is done on the packet cache in order to find all the matching Interests, meaning Interests with the same name that can be satisfied with the received data. If no match is found, the data is dropped. Otherwise (InterestHit) the data packet is cloned to satisfy all the matching Interests. In this way hICN is able to multicast the content to many users. This allows the hICN architecture to scale with the number of content streams, not with the number of users, since only one request per content is forwarded in the network. hICN-RTC maximize advantages from Interest aggregation and hICN multicast, as described further below.

Consumer/Producer Socket API

Consumer and producer sockets are APIs that applications can leverage to implement location independent communications in hICN. hICN provides an API implementation of two name-based socket types: "producer socket" and "consumer socket." These sockets are unidirectional and are used to send data at the producer side, and to receive data at the consumer side.

The consumer socket pulls data sending Interests (also referred to as "requests"), with no knowledge of the location of the one or multiple producers that can reply to the Interests. For example, the network, e.g., hICN routers, can reply to an Interest sent by a consumer in case of a data hit in the packet cache, as described previously. The consumer socket also implements the transport protocol that is responsible to decide which and how many Interests to send at any time. This protocol referred to as the "The Realtime Information Centric Transport Protocol (RICTP)," and is described below.

The producer socket responds to Interests coming from one or multiple consumers with no knowledge of their location. The role of the producer socket in RICTP is described below. The producer socket also offers per-packet integrity and data origin authentication which are exploited by the consumer socket to verify the validity of the data, i.e., the data has been originated by a trusted producer and never modified. Data confidentiality is instead left to the application or higher layer protocols.

WebRTC

WebRTC architecture has evolved significantly from the original peer-to-peer mesh. One architectural option for WebRTC includes a selective forwarding unit (SFU)-based architecture. More specifically, with reference to FIG. 3, there is an illustration of an SFU-based architecture 300 in which embodiments directed to hICN-RTC may be implemented. SFU-based architecture 300 includes multiple participant devices 302(1)-302(3) (also referred to as "participants" or "clients" P1-P3, respectively) operated by/associated with respective users of the participant devices, and an intermediate network device/node (referred to as a hybrid forwarding unit (HFU) 304) configured to connect to, and communicate with, each of the participant devices over a communication network 306. Communication network 306 may include one or more wide area networks (WANs), such as the Internet, and one or more local area networks (LANs). Communication network 306 may also include an ICN network to which participant devices P1-P3 and HFU 304 connect to communicate with each other.

SFU-based architecture 300 supports communication sessions between participant devices P1-P3, such as a conference between the users of the participant devices, in which the participant devices connect to HFU 304 and exchange multimedia content with each other through the HFU. The multimedia content may include audio in the form of audio streams, video in the form of video streams, text, chat, and so on, associated with users of the participant devices. To this end, HFU 304 operates as a central or intermediate network device/node for streaming of audio and video between participant devices P1-P3 when connected to the HFU. For example, each participant device Pi sends its associated audio stream and video stream to HFU 304. HFU 304 decides which of the streams to forward to participant devices P1-P3. This adds flexibility as HFU 304 may decide to drop streams that are deemed not important and to forward only the important ones, such as the streams from "active speaker" participant devices (i.e., participant devices deemed to be associated with users of the participant devices who are active speakers/talkers) among the participant devices, as described below. The selection of which streams to forward may be achieved without any media processing at HFU 304, to avoid inducing extra delay or processing at the HFU (or at participant devices P1-P3).

Real-Time Communication Architecture Over Hybrid Information Centric Networking (hICN-RTC)

hICN-RTC builds upon the WebRTC SFU-based architecture and adapts it to hICN by: (i) hICN integration at the participant devices (e.g., participant devices P1-P3) and at the HFU (e.g., HFU 304), (ii) minimal modifications to the interaction with the application-layer, and (iii) implementing an RTC-tailored hICN transport protocol.

In hICN-RTC, participant devices and the HFU include:
a. WebRTC application logic (e.g., encoding/decoding audio and video flows at the participant devices and forwarding streams without any transcoding operation at the HFU). For example, HFU 304 includes an application 308 representative of the WebRTC application logic.
b. An hICN transport layer (not specifically shown in FIG. 3) to carry video flows between participant devices and the HFU in hICN packets. Audio flows may be carried similarly between the participant devices and the HFU.
c. An hICN forwarder operating on hICN packets. For example, HFU 304 includes HFU forwarder 310 representative of the hICN forwarder.

hICN-RTC modifies the interaction between the application and the network transport to exploit aggregation and multicasting features of the underlying hICN network. Specifically, an ad-hoc hICN naming scheme and a new communication flow between participant devices and HFU are defined herein, which are transparent to the WebRTC participant device (e.g., client) and the HFU application.

In accordance with the naming scheme, the video of/from each participant device (i.e., the video associated with a participant device in a conference) is named using (i) a participant specific name_prefix, e.g., /video/participant-1/ for video from participant device P1, and (ii) a set of pre-defined name_prefixes, e.g., /video/active-speaker-1/ for participant device P1, /video/active-speaker-2/ for participant device P2, . . . , /video/active-speaker-n/ for participant device Pi, to name the video streams of (i.e., associated with) the "active speaker" participant devices associated with users who are active speakers in the conference. The communication between the HFU and the hICN-RTC enabled participant device works as follows: the hICN transport layer at HFU pulls the video of the participant devices identified as being associated with users who are active speakers (i.e., from the active speaker participant devices), and re-names their video using the active speaker participant devices' name_prefixes. At the participant devices, the hICN transport layer pulls the video of the active speaker participant devices from the HFU, using the active speaker participant devices name_prefixes, e.g., /video/active-speaker-1/. This approach allows a reduction in the overhead at the application for two reasons: (i) since all of the participant devices request the same set of videos through the HFU, i.e., the videos of the active speaker participant devices, the requests from all of the participant devices are aggregated and satisfied by the hICN forwarder in the HFU. Thus, only a small portion of requests reaches the HFU application; and (ii) in hICN-RTC, the HFU pulls only the video from the active speaker participant devices, rather than retrieving the video streams from all of the participant devices including active speaker participant devices and non-active speaker participant devices (e.g., associated with users who are not considered/determined to be active speakers) and dropping those belonging to the non-active speaker participant devices. Therefore, only the streams that are really needed are requested.

Figure 4:
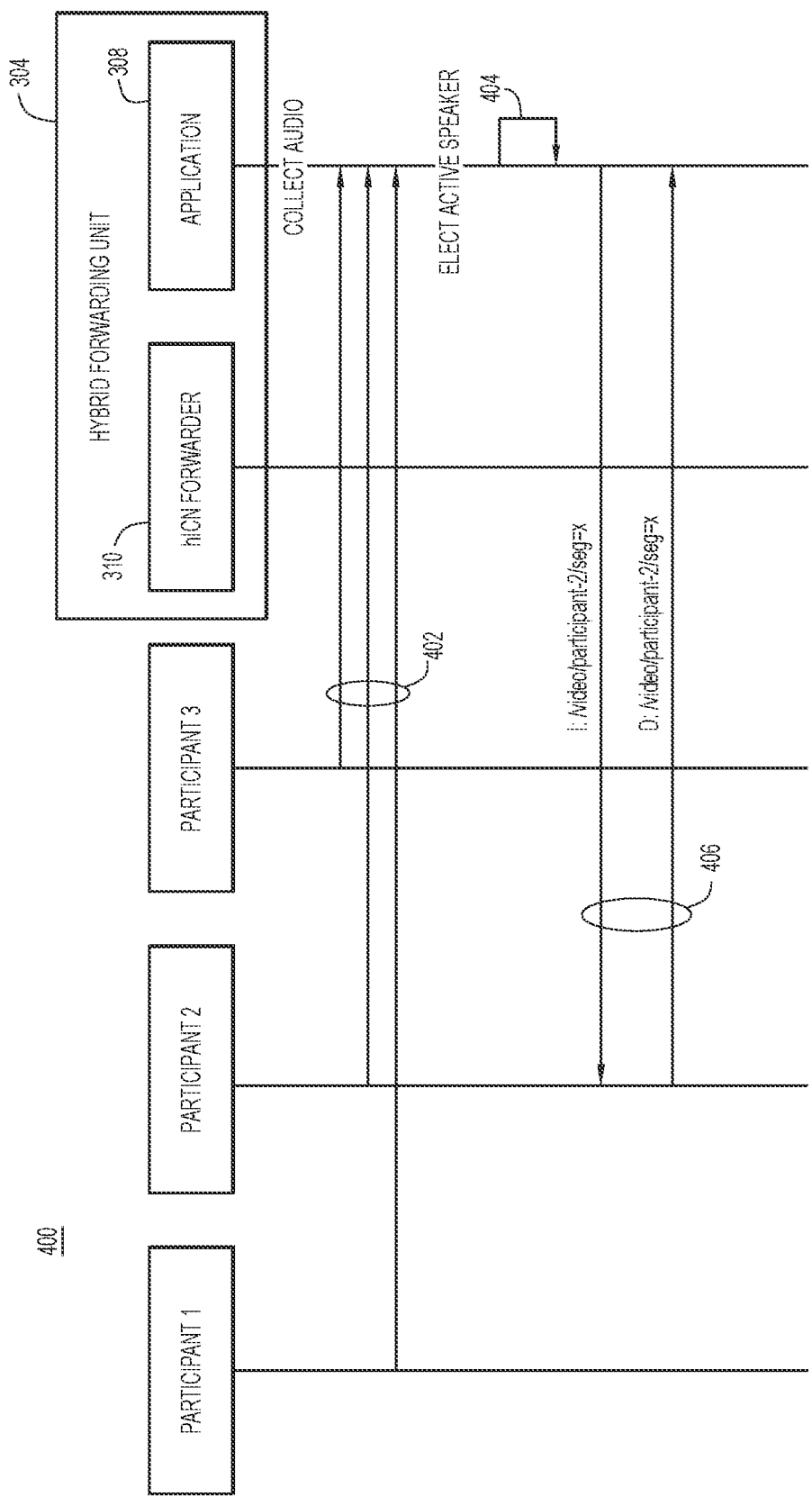
FIG. 4 is a transaction diagram that shows a method by which the SFU-based architecture distributes audio and video streams among participant devices associated with respective users in a conference over uplink connections, according to an example embodiment.

With reference to FIG. 4, there is a transaction diagram 400 that shows example hICN-RTC communications between participant devices P1-P3 and HFU 304 engaged in a conference. Transaction diagram 400 shows an "uplink" message exchange (defined below). Transaction diagram 400 assumes a single HFU (e.g., HFU 304) and participant devices P1-P3 connected to the HFU through communication network 306 with no hICN intermediate routers, although intermediate routers may be involved in other examples. The connections each includes an uplink and a downlink: the uplink, also known as contribution, is the connection between the participant device and the HFU, while, the downlink or distribution is the connection from the HFU to the participant device.

At 402, HFU 304 collects/receives from participant devices P1-P3 over respective connections respective audio streams (e.g., audio originating from users of the participant device devices P1-P3, and who may be speaking (i.e., who are active speakers) or silent (i.e., who are non-active speakers) at any given time). In an example, the connections may include User Datagram Protocol (UDP) connections. In another example, the collection of the audio streams may be via an ICN network. At 404, HFU 304 measures respective audio levels (e.g., voice activity levels) of the audio streams. Any known or hereafter developed technique for measuring audio levels of audio may be used. For example, a respective audio power level of each audio stream may be measured. HFU 304 ranks participant devices P1-P3 based on the respective audio levels of the respective audio streams. For example, HFU 304 ranks participant devices P1-P3 from highest to lowest such that the participant devices with relatively higher audio levels are ranked higher than participant devices with relatively lower audio levels. HFU 304 elects the top-N (i.e., top-N highest ranked) participant devices based on the audio levels as active speaker participant devices, i.e., as the participant devices being associated with users who are active speakers. Thus, the participant devices are ranked based on levels of audio generated by the users of the participant devices, and then the top-N participant devices are designated as the active speaker participant devices, the goal being to subsequently display the video associated only with the top-N active speaker participant devices.

At 406, HFU 304 retrieves respective video streams only from the top-N participant devices elected as the active speaker participant devices. HFU 304 retrieves the video streams using an exchange of Interests (Is) and data packets (Ds) that satisfy the Interests, as described above. Each video stream for each participant device (in this case, the participant device is an active speaker participant device) is segmented into a sequence of Real-Time Transport Protocol (RTP) packets (i.e., RTP video packets). Each RTP packet is carried in a (hICN) packet. The (hICN) name of each data packet includes a name_prefix of the participant device from which the video stream is being retrieved/requested, followed by a sequence/segment number of the RTP packet, e.g., /video/participant-2/seg=x. To retrieve the video stream, HFU 304 associates synchronization source (SSRC) identifiers, available in the audio stream from/associated with the same participant device, to the name_prefix associated with the active speaker participant device. The transport layer then constructs the entire hICN data name and retrieves the video stream. In the example of FIG. 4, HFU 304 elects participant device 2 as the only active speaker participant device, i.e., N=1, and the HFU retrieves only the video stream from active speaker participant device 2. This is the only video stream that will be displayed in the conference. More generally, there may be one or more active speaker participant device, i.e., N is one or more.

Figure 5:
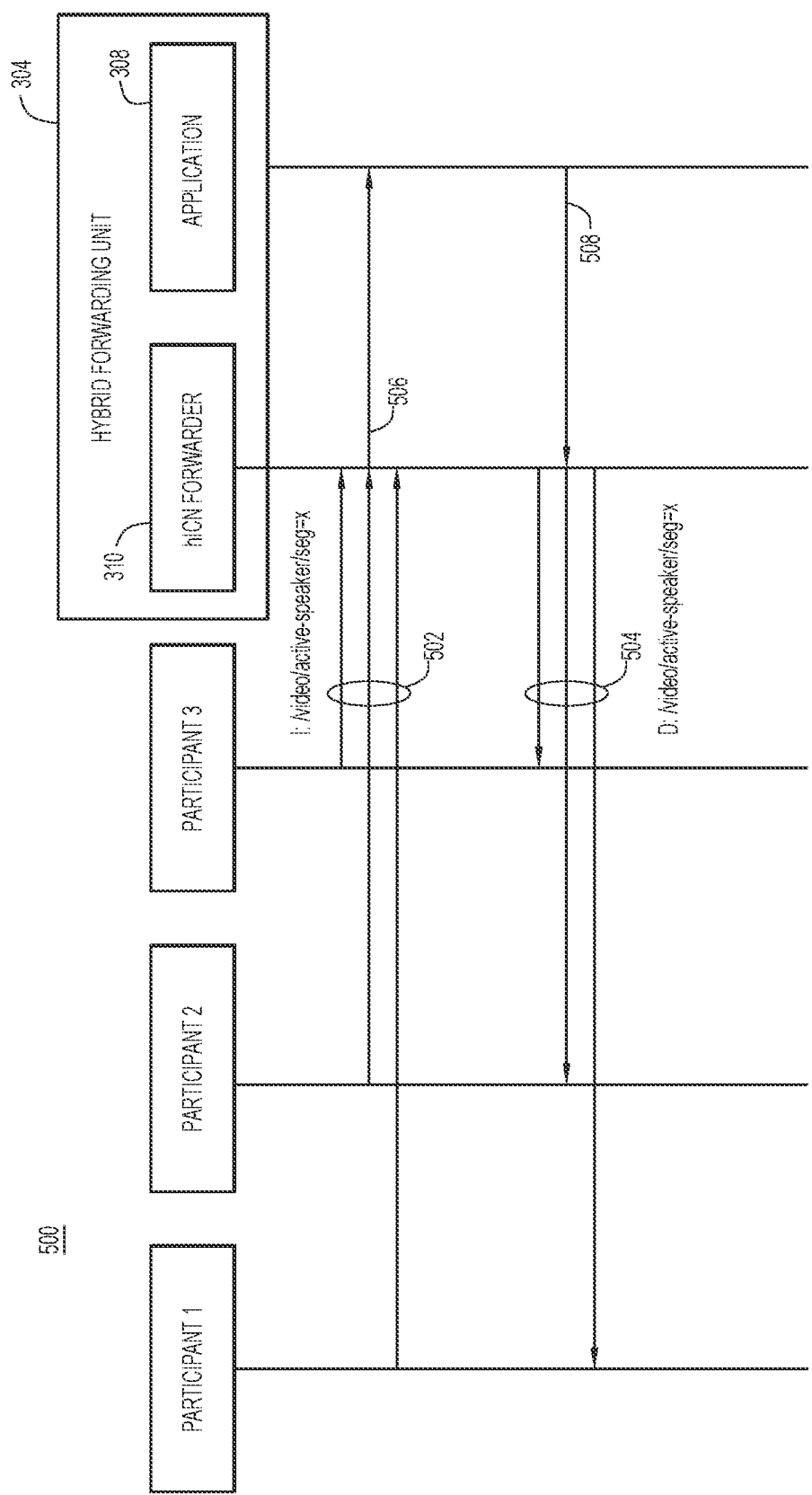
FIG. 5 is a transaction diagram that shows a method by which the participant devices of the conference retrieve video streams of "active speaker" participant devices deemed to be associated with users who are active speakers from a Hybrid Forwarding Unit (HFU) over downlink connections, according to an example embodiment.

With reference to FIG. 5, there is there is a transaction diagram 500 that shows an example of hICN-RTC communication between participant devices P1-P3 and HFU 304 for a downlink message exchange (defined above), that occurs after the uplink message exchange discussed in connection with FIG. 4. Generally, application 308 of HFU 304 collects video packets of video streams generated by all of participant devices P1-P3, but participant devices P1-P3 retrieve from the HFU only the video streams of the active speaker participant devices among participant devices P1-P3, in the following manner.

At 502, HFU 304 receives from participant devices P1-P3 respective requests (i.e., Interests) for video streams for the conference. A given participant device does not need to know which of the participant devices are the active speaker participant devices; the given participant device only needs to know the names used to serve the video streams from the active speaker participant devices. The names are distributed a priori, e.g., at bootstrap, and the number of active speaker participant devices supported by HFU 304 may be a configuration parameter. In the embodiments presented herein, only HFU 304 needs to know how to map the video streams coming from the participant device to active speaker names.

At 504, when HFU 304 receives valid data packets from an active speaker participant device, the HFU re-publishes the data packets to requesting participant devices P1-P3 using the pre-defined hICN name associated with the active speaker participant device, e.g., /video/active-speaker-1/seg=x, /video/active-speaker-2/seg=x. Note that these names, which are distributed to participant devices P1-P3 when the participant devices initially connect to HFU 304, are used by all participant devices to request the video of the active speaker participant devices.

As shown in the example of FIG. 5, at 502, HFU 304 (more specifically, forwarder 310) receives from participant devices P1-P3 respective requests for video streams associated with an active speaker participant device (e.g., a first request from participant device P1 for the video stream from the active speaker participant device (P2), a second request from participant device P2 for the video stream from the active speaker participant device, and a third request from participant device P3 for the video stream from the active speaker participant device). In response, HFU 304 (more specifically, forwarder 310):

a. Aggregates the respective requests (e.g., the first, second, and third requests) into a single aggregated request for the video stream associated with the active speaker participant device (P2).
b. At 506, sends the single aggregated request to application 308 that produces the video stream associated with the active speaker participant device.
c. At 508, receives from application 308 the video stream associated with the active speaker participant device.
d. At 504 sends to participant devices P1-P3 the video stream associated with the active speaker participant device.

Thus, HFU 304 (more specifically, forwarder 310) aggregates the three requests and sends only one aggregated request to application 308 to be satisfied by corresponding data packets, and distributes the data packets to all requesters P1-P3. This advantageously reduces loading on application 308.

RICTP

As mentioned above, hICN adopts a pull-based transport model which may potentially lead to additional latency suffered by consumers due to the fact that (i) a full round-trip time (RTT) elapses between Interest emission and reception of the corresponding data packet that satisfied the Interest, and (ii) consumers need to know which data to request, i.e., the segment number of the newly data packet generated by the producer.

RICTP overcomes the above-mentioned problems. RICTP performs rate and congestion control at the consumer and, to this end, maintains a window of pending Interests (Interests sent and not already satisfied by, e.g., a corresponding data packet) for data yet to be generated by the producer. RICTP proactively sends Interests for data segments (where each segment is included in a corresponding data packet) that are almost in production, in order to avoid additional delays due to the pull mechanism. The "window of pending Interests" is also referred to as a "pending Interest window" or a "pending Interest window number of Interests." The pending Interest window is a variable named "currentWin" in the algorithms presented below. RICTP operations performed by hICN producer/consumer sockets integrated at both the producer and the consumer (i.e., the producer and the consumer devices may each include both producer and consumer sockets) are described below.

RICTP Producer Socket

The pseudo code for the producer socket is shown below in Algorithm 3.

---

Algorithm 3: RICTP Producer Socket
Function OnInterest(Interest)
    segment = getSegment(Interest);
    lifetime = getLifetime(Interest);
    maxSeg = currentSeg + lifetime * prodRate;

-continued if segment < currentSeg or segment > maxSeg then
        sendNack(currentSeg, prodRate);
    // else: do nothing, drop packet
Function OnDataRTP(rtpPacket)
    data = createData(rtpPacket, prefix, currentSeg);
    sendData(data);
    currentSeg ++;

---

The basic function of the RICTP producer socket is to packetize RTP data received from the application (e.g., application 308) and make data packets available to the hICN forwarder (e.g., forwarder 310). In addition, the RICTP producer socket provides the consumer with the information needed to generate Interests for upcoming data. Algorithm 3 details the actions executed by the producer socket. More precisely, when the producer socket receives an Interest from the network it executes the OnInterest function: it extracts the segment from the Interest name, as well as the Interest lifetime. Using these values, it computes the maxSeg, which is the largest segment number that will be produced by the socket before the expiration of the received Interest. The producer socket also keeps track of the segment number to use for the next data packet. This value is stored in currentSeg.

If the Interest segment number is smaller than currentSeg or larger than maxSeg, then the Interest refers respectively to a data packet produced in the past or to be produced too far ahead in the future. If so, the producer replies with a negative acknowledgment (Nack). A Nack is a normal data packet that contains the currentSeg and the current production rate of the producer, called prodRate. The Nack packets are produced with a cache lifetime equal to 0 to prevent caching in the network so that consumers always receive updated information. The operations at the consumer side upon reception of Nack are further described as part of consumer socket operations.

If segment>currentSeg and segment<maxSeg, the producer socket does not generate a Nack, rather it drops the received Interest packet. When the producer socket receives an RTP packet from the application it runs the OnDataRTP function: the producer socket generates an hICN data packet with the received RTP packet as payload, using as a name the prefix specified by the application and, as a segment number, currentSeg. This packet is passed to the hICN forwarder to satisfy corresponding pending Interests. By satisfying all consumer requests for the same data packet, it offloads the application for packet replication operations and possibly for retransmission in case of packet loss as data packets are cached (caching lifetime may be set to 1, for example).

RICTP Consumer Socket

The pseudo code for the consumer socket is shown below in Algorithm 4.

---

Algorithm 4: RICTP Consumer Socket: Packets handling
Function OnDataNack(Nack)
    inFlight --;
    segment = getSegment(Nack);
    inProduction = getSegmentInProduction(Nack);
    estimatedProdRate = getProductionRate(Nack);
    nextSegment = inProduction +1;

```
        if inProduction > segment then
            phase = CATCH_UP;
            increaseWindow( );
        else
            decreaseWindow( );
            phase = IN_SYNC;
        scheduleInterest( );
    Function OnDataRTP(data)
        inFlight --;
        updateRtt(getRtt(data));
        sendContentToApp(getRTP(data));
        if phase == CATCH_UP then
            increaseWindow( );
        scheduleInterest( );
    Function scheduleInterest( )
        while inFlight < currentWin do
            sendInterest(prefix, nextSegment);
            inFlight ++;
            nextSegment ++;
    Function OnNewRound( )
        estimatedProdRate = receivedBytes/ roundDuration * τ ;
        minRtt = getMinRtt( );
        if no Nacks in the last 4 rounds then
            phase = IN_SYNC;
        updateWindow( );
```

The RICTP consumer socket has two main objectives: (i) to learn current segment number used by the producer socket when generating data packets with successive current segment numbers in order to synchronize segment numbers in consumer requests (i.e., Interests) with the current segment numbers; and (ii) to adjust the pending Interest window in order to avoid additional latency in media retrieval. To this end, the consumer socket defines two phases: CATCH_UP and IN_SYNC. In the CATCH_UP phase, the consumer socket tries to quickly estimate the number of pending Interests to send to the producer to match its production rate. Once consumer/producer sockets are synchronized, the consumer switches to the IN_SYNC phase, where the consumer socket adapts its Interest rate to network variation, while trying to remaining in sync with the producer socket. Thus, the consumer socket implements a synchronization process that synchronizes the segment numbers in the Interests with the current segment numbers in the data packets generated at the producer socket such that (i) once sent by the consumer socket, the Interests arrive at the producer socket approximately when approximately when the data packets are generated with current segment numbers that match the segment numbers of the Interests, and (ii) an Interest sending rate (i.e., a rate for sending the Interests to the producer socket) that matches the production rate of the data packets. As a result, the consumer socket sends the Interests, as synchronized, at the Interest sending, which matches the data packet production rate.

When the consumer socket joins the conference, the consumer socket and the producer socket are not synchronized, so the consumer socket enters the CATCH_UP phase and starts requesting the segment number 0. At this point, currentWin (i.e., the pending Interest window) and inFlight are set to 1, while maxWin is initialized to MIN_WINDOW, a constant value, e.g., 5. Consumer Interests are matched/satisfied by valid RTP data or Nack packets (simply "Nacks") as previously explained. Function OnDataNack is executed upon reception of a Nack at the consumer socket. First, the consumer socket decrements inFlight to free one space in the window that can be used to send another Interest. Then the consumer socket extracts from the Nack its segment number, and the inProduction segment, that is transported by the Nack in its payload. The reception of a Nack indicates that the consumer socket is out of sync with the producer socket. To quickly re-synchronize, the consumer socket sets nextSegment (the segment number used for the next Interest) equal to inProduction+1. In addition, the consumer socket updates the estimation of the production rate using the value in the Nack packet. This value is used to adjust the pending Interest window as further discussed. If inProduction is larger than segment, the consumer socket is asking for old Data. If so, the consumer socket switches to the CATCH_UP phase and increases the window. Otherwise, the consumer socket is in IN_SYNC with the producer socket, since the consumer socket has a full pending Interest window of valid pending Interests, but the value of the pending Interest window is too large and it has to be decreased. At the end of the function the consumer socket schedules a new Interest transmission.

When a data packet is received, the consumer socket executes the function OnDataRTP. As in the case of Nack reception, the consumer socket reduces the value of inFlight and recomputes the minimum RTT based on the current estimate. Then, the consumer socket removes the hICN header from the data packet, sends the RTP packet to the application, increases the window size, if in CATCH_UP phase, and schedules a new Interest. It is worth noting that the RTP packet is sent to the application even before IN_SYNC phase. In fact, valid data packets can be received and displayed even during the CATCH_UP phase.

The function scheduleInterest is called upon receipt of each data packet and upon receipt of each Nack. When called, scheduleInterest sends to the producer socket a burst or group of successive Interests equal in number to a difference between inFlight and currentWin (see the while loop in scheduleInterest). The burst of Interests may include only one Interest, or multiple Interests, depending on the difference. In the CATCH_UP phase, in a situation where the consumer socket is not synchronized with the producer, such that the Interest sending rate lags the data packet production rate, and the segment numbers lag the current segment numbers, the consumer socket increases the window size (currentWin) (each time scheduleInterest is called) relative to inFlight, to cause scheduleInterest to increase the number of Interests sent in each burst of Interests so that the burst size is more than 1. As scheduleInterest is repeatedly called over time (upon receipt of each data packet and each Nack), the increase in the number of Interests sent per burst over a given time period (relative to before the increase in the burst size) results in a corresponding increase in the Interest sending rate (e.g., average number of Interests sent per unit time); thus, the once lagging Interest sending rate and the once lagging segment numbers catch up to the production rate and the current segment numbers over time.

Once the Interest sending rate and the segment numbers have caught up, i.e., are synchronized (as indicated by results of the various segment number/current segment number comparison tests and tracking of successive Nacks as evaluated in the consumer socket algorithms), the consumer socket transitions to the IN_SYNC phase. In IN_SYNC, the size of currentWin is adjusted only slightly over time so that the burst size dithers around a relatively settled value, in order to maintain the segment numbers and Interest sending rate in a synchronized state. Thus, the consumer socket tracks Flight over time, and adjusts, relative to inFlight, currentWin (which is indicative of the rate of production of Interests) to achieve the synchronizing of the segment numbers in the Interests with the current segment numbers.

The consumer socket operates based on successive "rounds" or time slots, which the consumer socket tracks, e.g., using a respective identifier for each round. The function OnNewRound is called periodically, e.g., once per round (i.e., once per time slot). The function OnNewRound estimates the production rate of the producer socket and the minRtt. The production rate is computed by dividing the bytes received in the last round by the round duration. This value is multiplied by an incremental factor τ in order to account for estimation error and RICTP uses an exponential weighted moving average of the estimated production rate. The minimum RTT is computed as the minimum RTT measured in the last R rounds of the protocol (R=30 in our implementation), so that the estimation can take into account possible changes in the network RTT. This function also determines phase switch: if the consumer socket receives any Nack in the last 4 rounds, RICTP considers the consumer socket to be synchronized with the producer socket.

Pseudo code for the adjusting the window at the consumer socket is shown below in algorithm 5.

```
Algorithm 5: RICTP Consumer Socket: Window adjustment
Function computeMaxWindow( )
    if phase == IN_SYNC then
        delay = minRtt;
    else
        delay = InterestLifetime;
    maxWin = delay * estimatedProdRate;
Function increaseWindow( )
    computeMaxWindow ( );
    currentWin = min(maxWin, currentWin +1);
Function decreaseWindow ( )
    if is the first time in this round then
        currentWin = currentWin *2/3;
    else
        currentWin --;
    currentWin = max(currentWin, MIN_WINDOW);
Function updateWindow( )
    if phase == IN_SYNC then
        computeMaxWindow( );
    if currentWin < (maxWin *2/3) then
        currentWin = min(maxWin, currentWin * α);
    else if currentWin > maxWin then
        currentWin = max(currentWin * (β, MIN_WINDOW);
```

During the CATCH_UP phase, the consumer socket increases the window exponentially to quickly synchronize with the producer socket (increaseWindow function). The increaseWindow function calls the computeMaxWindow function, which uses maximum window size maxWin as a bandwidth delay product, where the bandwidth is the estimated production rate of the producer socket, and the delay varies according to consumer phase. During the CATCH_UP phase the consumer socket uses the InterestLifetime as delay. RICTP uses the InterestLifetime as delay for two reasons: (i) during the CATCH_UP phase the consumer socket may have a wrong estimation of the minimum RTT; and (ii) it allows the consumer socket to generate a larger window, accelerating synchronization with producer production rate even in case of a large network delay. In the IN_SYNC phase, instead, the delay is equal to the minimum RTT, minRtt, estimated at each round. This allows the consumer socket to maintain a window size close to the minimum value required to remain synchronized with the producer socket. The window size is decreased every time the consumer socket receives a Nack using the function decreaseWindow. When the function is called for the first time in a round (i.e., time slot), the window is reduced by ⅔, while for subsequent Nacks the consumer socket reduces the window by 1, not to decrease the window too drastically, thus to prevent going out of sync with the producer socket. During the IN_SYNC phase, the consumer socket tries to keep the window as stable as possible by running the function updateWindow once per round. If the currentWin is smaller the ⅔ of the maxWin the window is increased by an increase factor α (which is greater than 1). If the currentWin is larger than maxWin (e.g., when the consumer socket switches from CATCH_UP to IN_SYNC phase), currentWin is decreased by a factor β (which is less than 1). The window remains constant otherwise.

Packet Loss Recovery: In ICN, the consumer socket is responsible for recovery of lost packets. In hICN, like in ICN, a loss is detected when an Interest timeout occur. This happens if an Interest is not satisfied within is lifetime. Unfortunately, this is not enough in real time applications, since the Interest lifetime can be quite large, hence late detection would imply not-in-time recovery. To overcome this problem RICTP leverages RTCP control packets generated by the application and more precisely, an RTCP Generic NACK packet generated at loss detection. RICTP intercepts such packets and generates new Interests to trigger retransmission either from an in-network cache (if available) or from the producer socket.

Flowcharts

Flowcharts of various methods described above are now described in connection with FIGS. 6-13A. The term "consumer" is construed broadly to mean consumer device, consumer socket, participant device, or HFU, depending on context. Similarly, the term producer is construed broadly to mean producer device, producer socket, participant device, or HFU depending on context. Also, the HFU and a given participant device each includes both a consumer socket and a producer socket. Regarding context, when the participant device sends Interests to the HFU and receives data packets satisfying the Interests from the HFU, the participant device is a consumer and the HFU is a producer. Alternatively, when the HFU sends Interests to the participant device and receives data packets satisfying the Interests from the participant device, the HFU is the consumer and the participant device is the producer.

Figure 6:
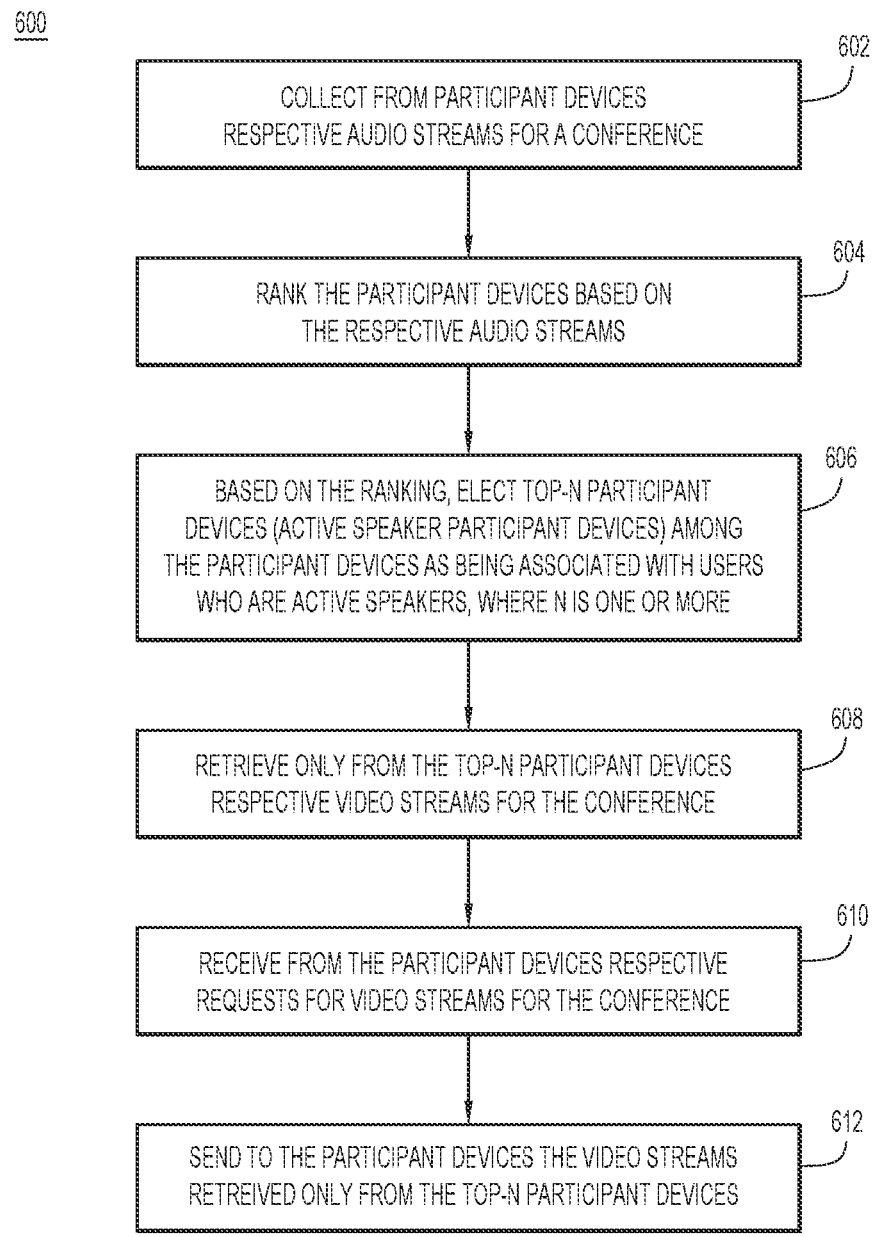
FIG. 6 is a flowchart of a method of distributing video streams of the active speaker participant devices among the participant devices in the conference, performed by the HFU, according to an example embodiment.
Figure 7:
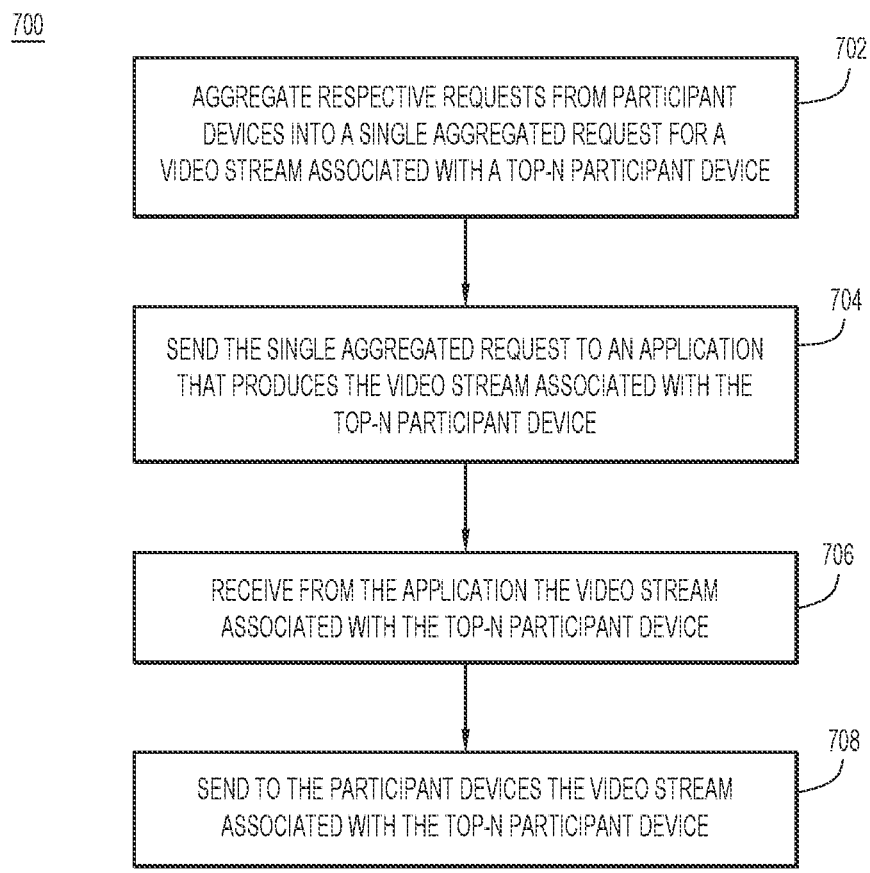
FIG. 7 is a flowchart of a method of aggregating requests for video streams performed at the HFU, expanding on an operation of the method of FIG. 6, according to an example embodiment.
Figure 8:
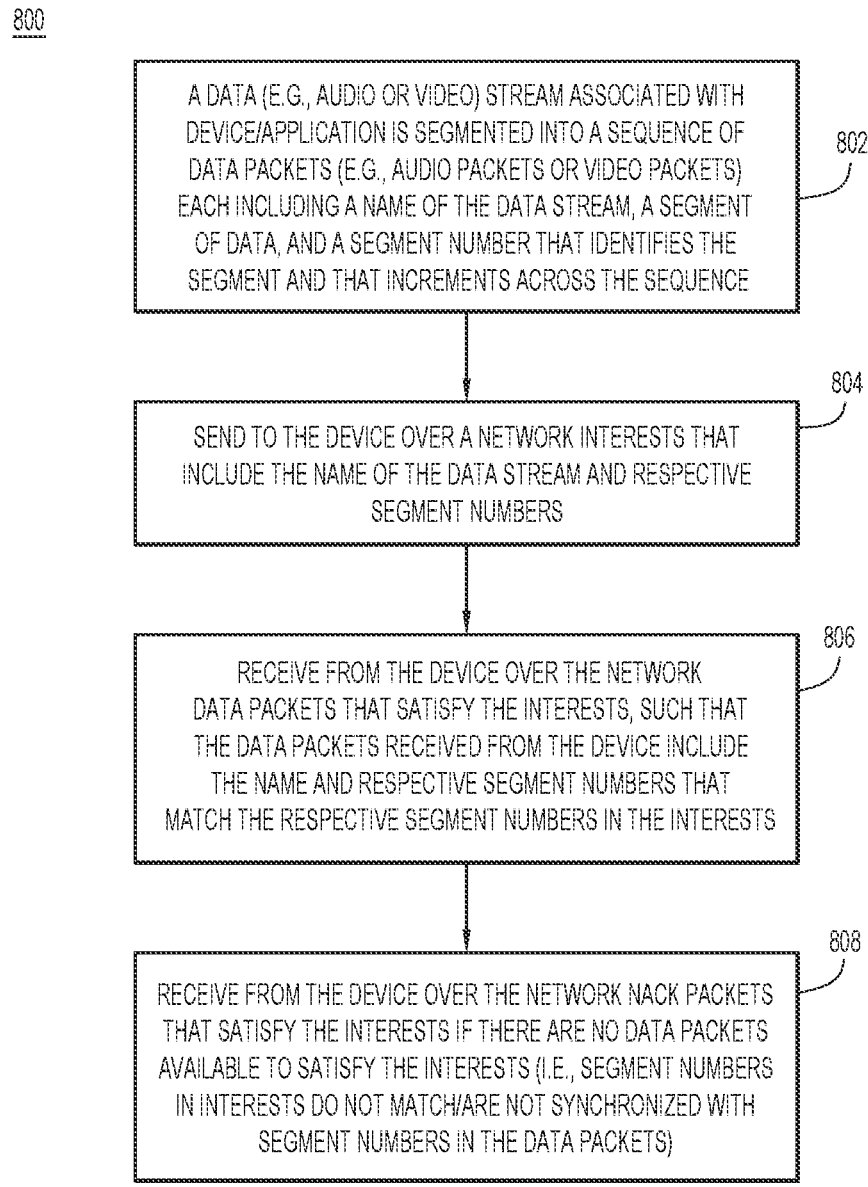
FIG. 8 is a flowchart of a generalized method of retrieving/collecting data from a producer over an ICN, performed by a consumer, according to an example embodiment.

The flowcharts of FIGS. 6-8 focus most specifically on methods performed in hICN-RTC. The flowcharts of FIGS. 9-13A focus most specifically on methods performed in RICTP.

With reference to FIG. 6, there is a flowchart of an example method 600 of distributing video from active speaker participant devices associated with users who are active speakers in a conference among participant devices (e.g., participant devices P1-P3), for example, performed by an HFU (e.g., HFU 304). The HFU is configured to connect with the participant device over a communication network, such as, but not limited to, an ICN, to distribute audio streams and video streams among the participant devices. Method 600 uses operations described above in connection with FIGS. 4 and 5, for example.

At 602, the HFU collects from the participant devices respective audio streams for the conference.

At 604, the HFU ranks the participant devices based on the respective audio streams collected from the participant devices.

At 606, based on the ranking, the HFU elects top-N participant devices among the participant devices as being associated with respective users who are active speakers, where N is one or more. The top-N participant devices are also referred to as active speaker participant devices. N is one or more, and may be a predetermined parameter.

At 608, the HFU retrieves respective video streams only from the top-N participant devices.

At 610, the HFU receives from the participant devices respective requests for video streams of the top-N participant devices.

At 612, the HFU sends to the participant devices the video streams retrieved only from the N participant devices.

With reference to FIG. 7, there is a flowchart of an example method 700 of aggregating requests for video streams performed at the HFU, for example, when, at operation 610 of method 600, the HFU receives from the participant devices respective requests for video streams associated with each top-N participant device, e.g., from a particular top-N participant device. Method 700 uses operations described above in connection with thread diagram 500 of FIG. 5. For each top-N participant device, e.g., the particular top-N participant device, the HFU performs the following operations.

At 702, the HFU aggregates the respective requests into a single aggregated request for the video stream associated with/from the particular top-N participant device.

At 704, the HFU sends the single aggregated request to an application (which may be hosted on the HFU) that produces/generates the video stream associated with the particular top-N participant device.

At 706, the HFU receives from the application the video stream associated with the particular top-N participant device.

At 708, the HFU sends to the participant devices the video stream associated with the particular top-N participant device.

With reference to FIG. 8, there is a flowchart of an example method 800 of retrieving/collecting data (e.g., audio or video) from a producer over a network, performed by a consumer. Method 800 includes various hICN-RTC operations described above. The retrieving/collection of the data may be performed over UDP connections or an ICN network as described above, or via any other type of network.

At 802, at the producer, a data stream (e.g., audio or video stream) associated with a device/application is segmented into a sequence of data packets (e.g., RTP audio packets or RTP video packets). Each data packet includes a name of the data stream (e.g., a name prefix), an RTP packet (e.g., an RTP carrying audio or video), and a segment number (e.g., a name suffix) that identifies the packet in the segment. The segment number may increment for successive data packets in the sequence. For generality, each data packet may be said to carry a segment of data (e.g., a segment of audio or a segment of video) in the form of an RTP packet or any other type of content carrying packet.

At 804, the consumer, sends to the producer over the network Interests that include the name of the data stream and respective segment numbers.

At 806, the consumer receives from the producer over the network data packets that satisfy the Interests, such that the data packets received from the producer include the name and respective segment numbers that match the respective segment numbers in the Interests.

At 808, the consumer receives from the producer over the network Nack packets that satisfy the Interests if there are no data packets available to satisfy the Interests (i.e., if the segment numbers in the Interests do not match/are not synchronized with segment numbers in the data packets as the data packets are produced).

Figure 9:
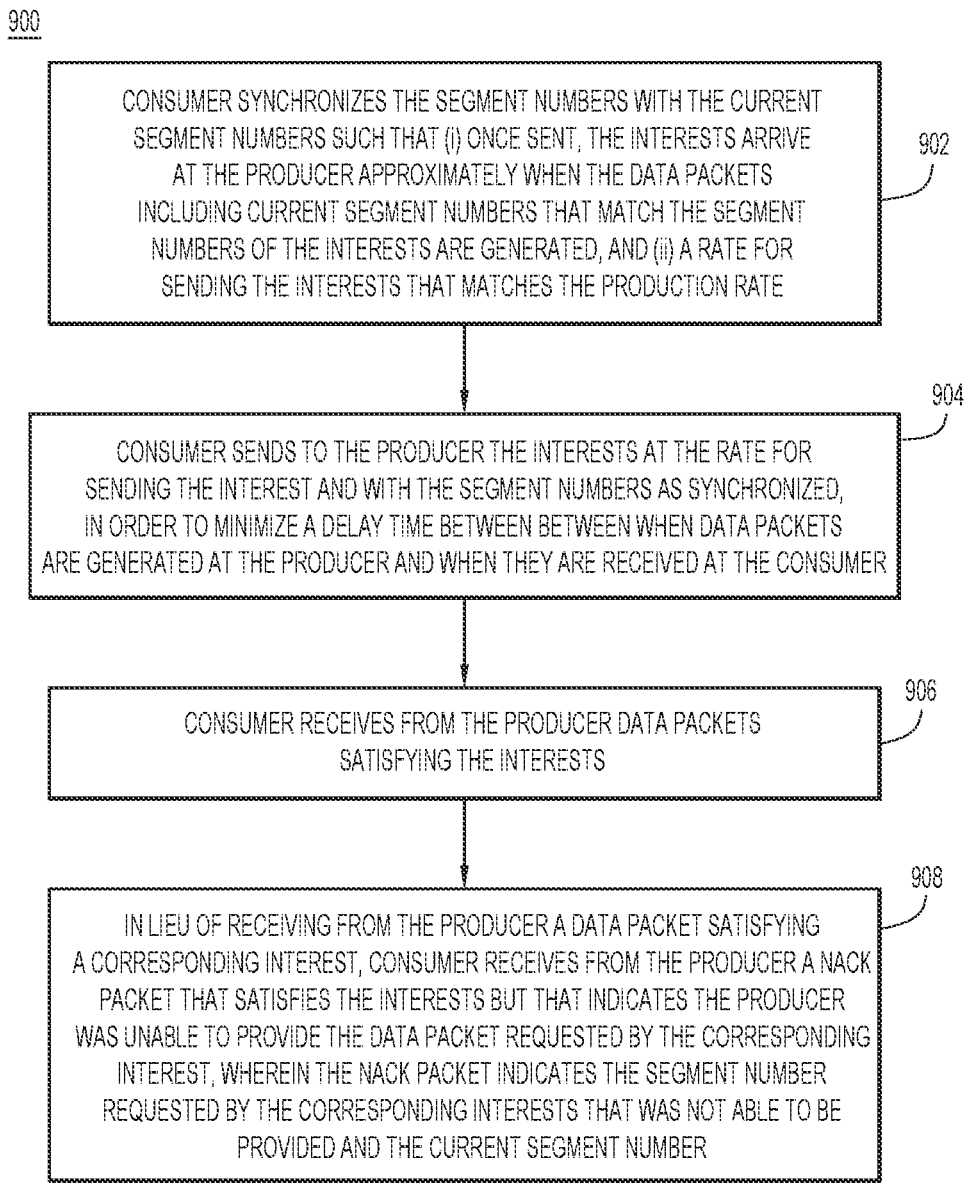
FIG. 9 is a flowchart of high-level operations performed by a Realtime Information Centric Transport Protocol (RICTP) consumer socket, according to an example embodiment.

With reference to FIG. 9, there is a flowchart of high-level operations 900 performed by a consumer (e.g., by an RICTP consumer socket hosted on the consumer). The consumer is configured to send to a producer (e.g., an RICTP producer socket on a producer) Interests to request data packets of a data stream that are generated at a production rate (prodRate/estimatedProdRate) at the producer. Each data packet includes a name of the data stream, an RTP packet, and a segment number (inProduction/currentSeg) that increments as the data packets are generated. The Interests each include the name and segment numbers (segment/nextSegment) of that identifies the data packet in the sequence of data packets.

At 902, the consumer synchronizes the segment numbers (in the Interests) with the current segment numbers (in the data packets) such that (i) once sent from the consumer, the Interests arrive at the producer approximately when the data packets are generated with current segment numbers that match the segment numbers of the Interests, and (ii) a rate for sending the Interests that matches the production rate.

At 904, the consumer sends to the producer the Interests at the rate that matches the production rate and with the segment numbers as synchronized, in order to minimize a delay time between when data packets are generated and when they are received at the consumer.

At 906, the consumer receives from the producer data packets satisfying the Interests.

At 906, in lieu of receiving from the producer a data packet satisfying a corresponding Interest, the consumer receives from the producer a Nack packet that satisfies the Interests, but that indicates the producer was unable to provide the data packet requested by the corresponding Interest. The Nack packet indicates the segment number requested by the corresponding Interests that was not able to be provided and the current segment number.

Figure 10:
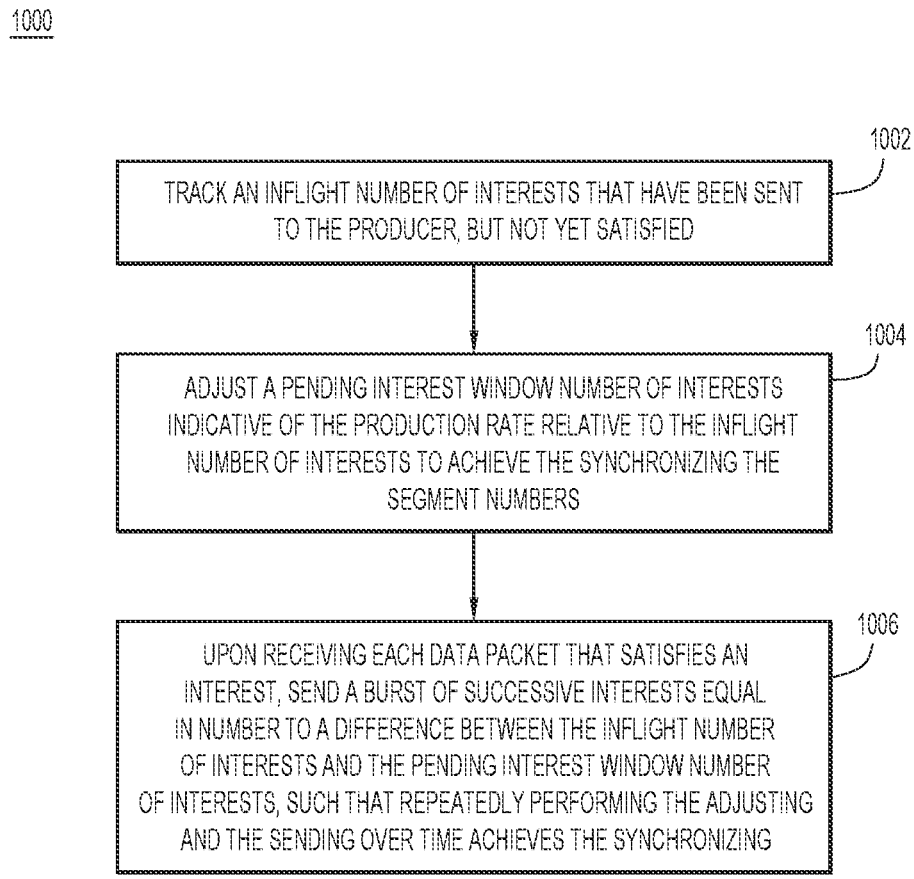
FIG. 10 shows operations expanding on a synchronizing operation of FIG. 9 performed by the RICTP consumer socket, according to an example embodiment.

With reference to FIG. 10, there are shown operations 1000 expanding on synchronizing operation 902.

At 1002, the consumer tracks an inFlight number of Interests (inFlight) that have been sent to the producer, but not yet satisfied.

At 1004, the consumer adjusts a pending Interest window number of Interests (currentWin) indicative of the production rate, relative to the inFlight number of Interests, to achieve the desired synchronizing of the segment numbers.

At 1006, upon receiving from the producer each data packet that satisfies an Interest, the consumer sends to the producer a burst of successive Interests equal in number to a difference between the inFlight number of Interests and the pending Interest window number of Interests (see while loop in function scheduleInterest( ), such that repeatedly performing the adjusting and the sending of the burst of Interests over time achieves the synchronizing.

Figure 11:
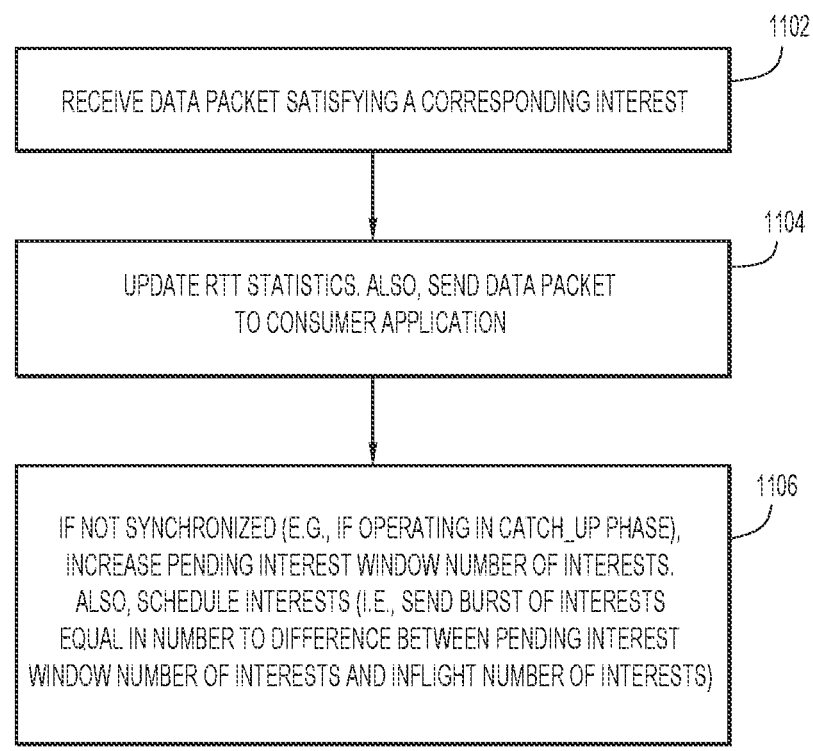
FIG. 11 shows operations performed by the RICTP consumer when a data packet is received, according to an example embodiment.

With reference to FIG. 11, there are shown operations 1100 performed by the consumer when a data packet is received (i.e., in response to the data packet). Operations 1100 include operations from function OnDataRTP.

At 1102, the consumer receives the data packet. In response, the consumer performs next operations 1104-1106.

At 1104, the consumer updates statistics on the RTT, and sends the data packet to a consumer application associated with the consumer.

At 1106, the consumer adjusts (e.g., increases) the pending Interest window if needed (when in the CATCH_UP phase, i.e., when the segment number and the current segment number are not synchronized, as described above). The consumer also schedules/sends Interests (e.g., calls scheduleInterest( ). In scheduleInterest( ) the consumer sends a burst of successive Interests. The burst includes a number of Interests equal to a difference between the pending Interest window number of Interests and the inFlight number of Interests. Also, for each Interest sent in the burst, scheduleInterest( ) increments the segment number and increments the inFlight number of Interests.

Figure 12:
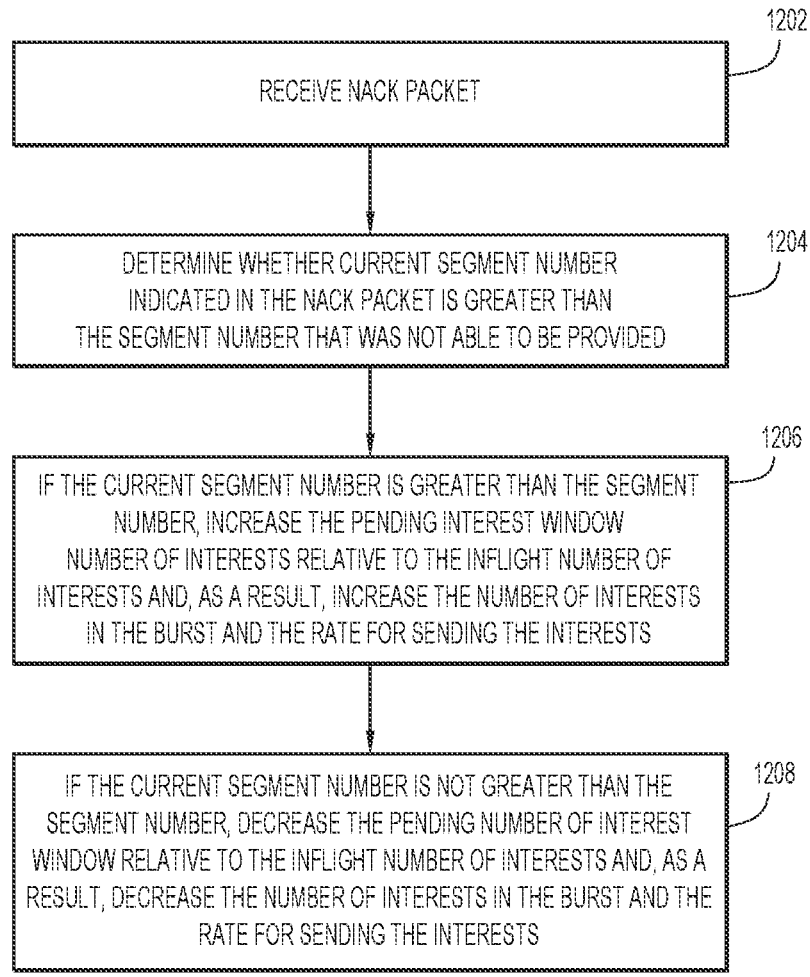
FIG. 12 shows operations expanding on a pending Interest window adjusting operation of FIG. 10, performed when a Nack packet is received, according to an example embodiment.

With reference to FIG. 12, there are shown operations 1200 expanding on operation 1004 (the operation to adjust the pending Interest window number of Interests), performed by the consumer when a Nack packet is received (i.e., in response to the Nack packet). Operations 1200 include operations from function OnDataNack.

At 1202, the consumer receives the Nack packet. In response, the consumer performs next operations 1204-1208

At 1204, the consumer determines whether the current segment number indicated in the Nack packet is greater than the segment number of the data packet that was not available to satisfy the corresponding Interest.

At 1206, if the current segment number is greater than the segment number, the consumer increases the pending Interest window number of Interests relative to the inFlight number of Interests and, as a result, increases the number of Interests in the burst and the rate for sending the Interests.

At 1208, if the current segment number is not greater than the segment number, the consumer decreases the pending Interest window relative to the inFlight number of Interests and, as a result, decreases the number of Interests in the burst and the rate for sending the Interests.

Figure 13A:
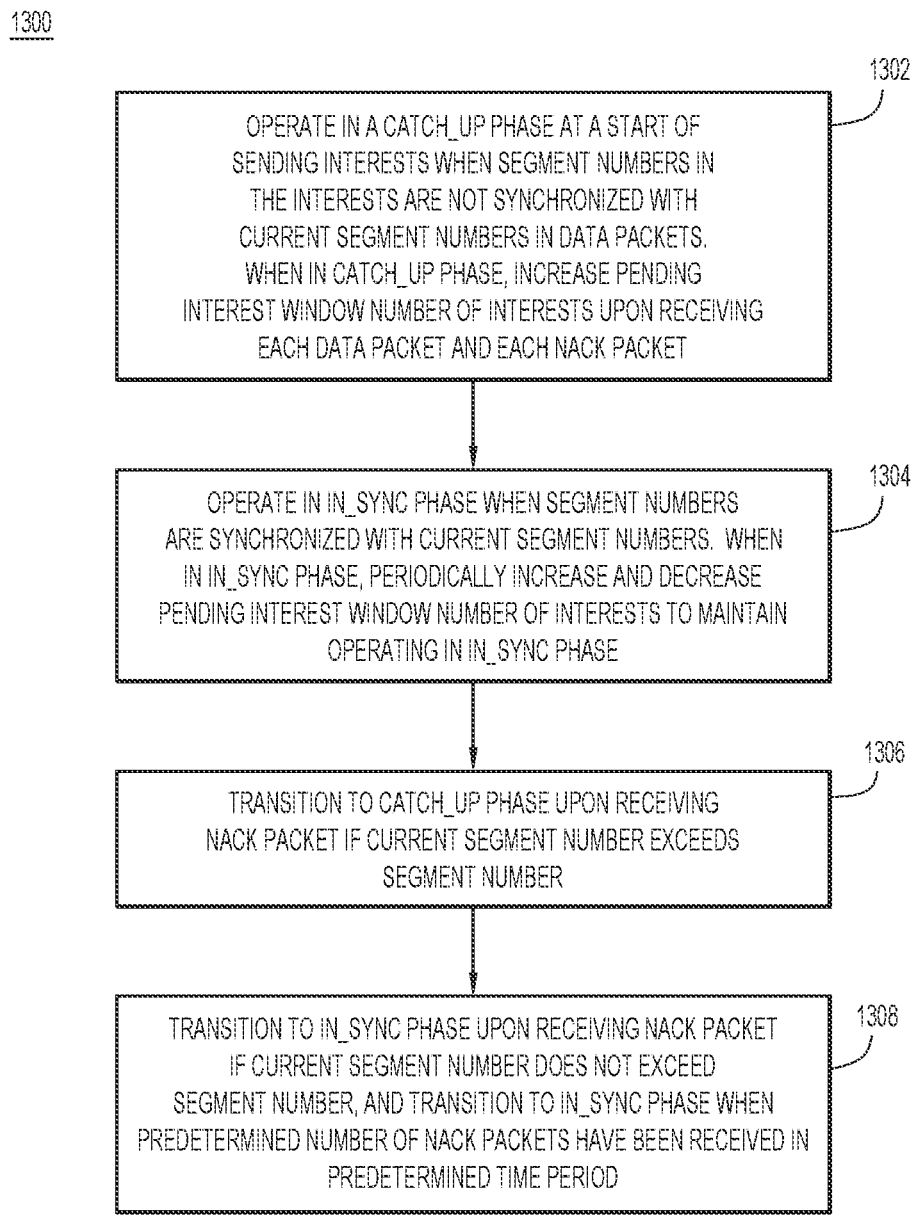
FIG. 13A is a flowchart of a method of operating in a CATCH_UP phase and an IN_SYNC phase at a consumer while synchronizing segment numbers in Interests to segment numbers in data packets, according to an example embodiment.

With reference to FIG. 13A, there is a flowchart of a method 1300 of operating in a CATCH_UP phase and an IN_SYNC phase at a consumer while synchronizing segment numbers in Interests to current segment numbers in data packets. Method 1300 includes operations described above in connection with Algorithms 4 and 5 for the consumer socket.

At 1302, the consumer operates in a CATCH_UP phase at a start of sending Interests to a producer when the segment numbers in the Interests are not synchronized with (i.e., matching) current segment numbers in requested data packets. When in the CATCH_UP phase, the consumer increases the pending Interest window number of Interests upon receiving from the producer each data packet and each Nack packet.

At 1304, the consumer operates in an IN_SYNC phase when the segment numbers are synchronized to the current segment numbers (i.e., matching, and sending rate is approximately equal to data production rate). When in the IN_SYNC phase, the consumer periodically increases and decreases the pending Interest window number of Interests by a slight amount to maintain the consumer in the IN_SYNC phase.

At 1306, the consumer transitions to the CATCH_UP phase upon receiving a Nack packet if the current segment number in the Nack packet exceeds the segment number in the Interest corresponding to (i.e., satisfied by) the Nack.

At 1308, the consumer transitions to the IN_SYNC phase upon receiving the Nack packet if the current segment number does not exceed the segment number, and transitions to the IN_SYNC phase when no Nack packets have been received in a predetermined time period (e.g., several hundred ms).

Packet Format

Figure 13B:
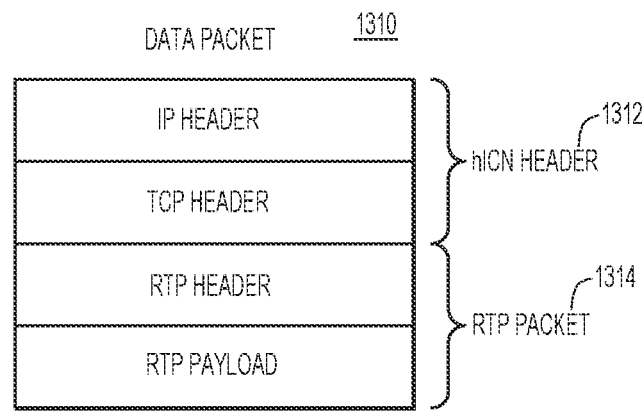
FIG. 13B is an illustration of a format of a data packet, according to an example embodiment.

With reference to FIG. 13B, there is an illustration of a format for an example data packet 1310. Data packet 1310 includes an hICN header 1312 including an IP header and a TCP header as described above, and an RTP packet 1314 that includes an RTP header and an RTP payload.

Figure 13C:
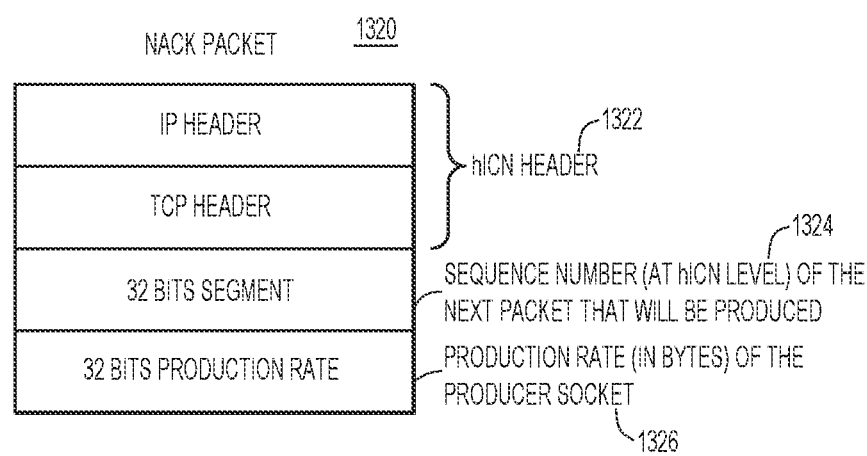
FIG. 13C is an illustration of a format of a Nack, according to an example embodiment.

With reference to FIG. 13C, there is an illustration of a format for an example Nack packet 1320. Nack packet 1320 includes an hICN header 1322 including an IP header and a TCP header as described above, a segment/sequence number 1324 of a next packet to be produced, and a production rate 1326 of a producer socket that generated the Nack packet.

Device Block Diagrams

Figure 14:
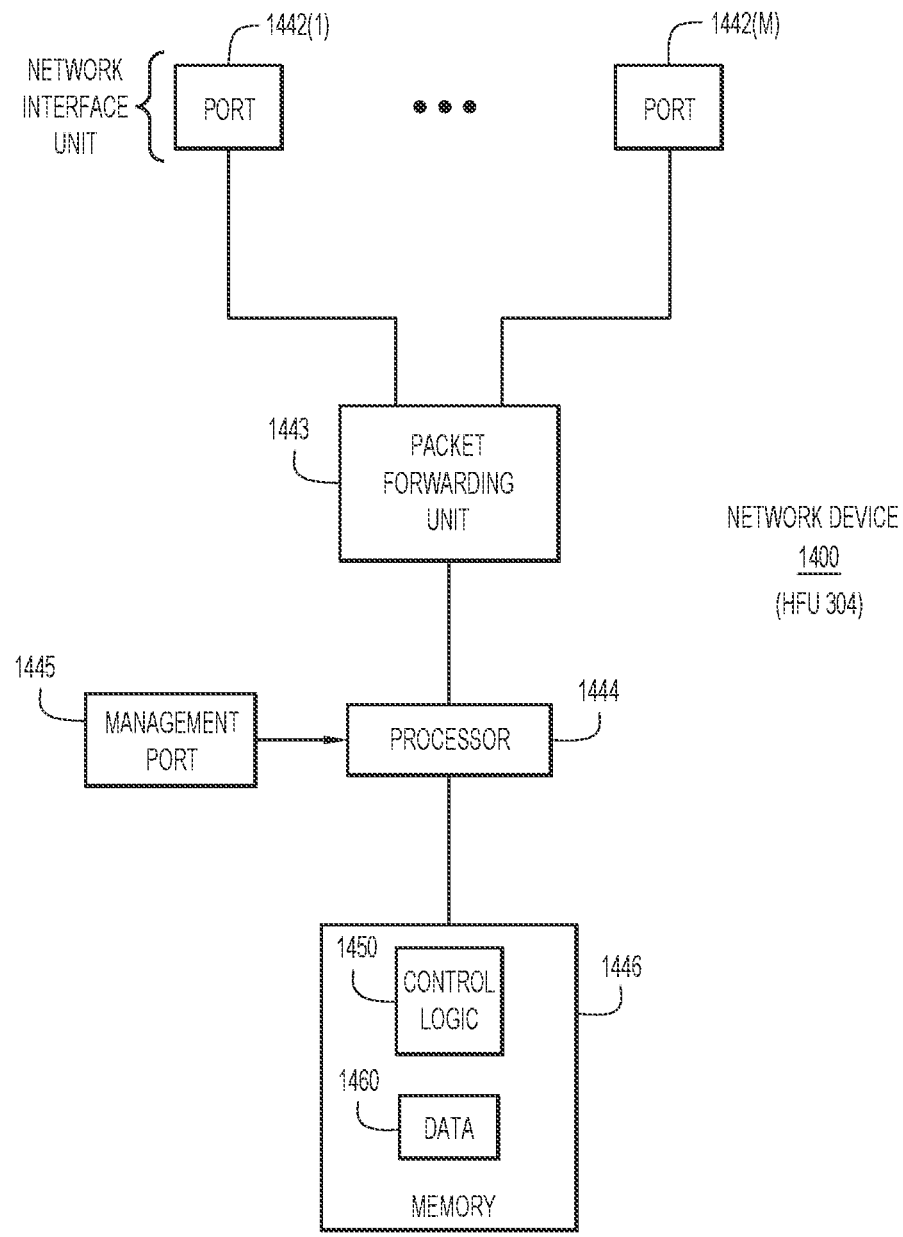
FIG. 14 is a block diagram of a network device representative of the HFU, according to an example embodiment.

With reference to FIG. 14, there is a block diagram of an example network device 1400, representative of an HFU, e.g., HFU 304. Network device 1400 may include a network router or a switch, for example. Network device 1400 comprises a network interface unit having a plurality of network input/output (I/O) ports 1442(1)-1442(M) to send traffic (e.g., packets) to a network and receive traffic (e.g., packets) from the networks, a packet forwarding/processing unit 1443, a network processor 1444 (also referred to simply as "processor"), a management port 1445 to exchange control messages with other network devices and an administration function, and a memory 1446. The packet forwarding/processing unit 1443 is, for example, one or more application specific integrated circuits (ASICs) that include packet buffers, packet queues, and other control logic for performing packet forwarding operations. The processor 1444 may include multiple processors, which may be implemented as software or hardware processors. For example, processor 1444 may include a microcontroller or microprocessor that is configured to perform higher level controls of network device 1400. To this end, the memory 1446 stores software instructions that, when executed by the processor 1444, cause the processor 1444 to perform a variety of operations including operations described herein. For example, the memory 1446 stores instructions for control logic 1450 to perform operations described herein. Control logic 1450 may also include logic components in packet forwarding unit 1443. Control logic 1450 includes logic to implement a forwarder (e.g., forwarder 310), an application (e.g., application 308), a consumer socket, a producer socket, and so on. Memory 1446 also stores data 1460 used and generated by logic 1450.

Figure 15:
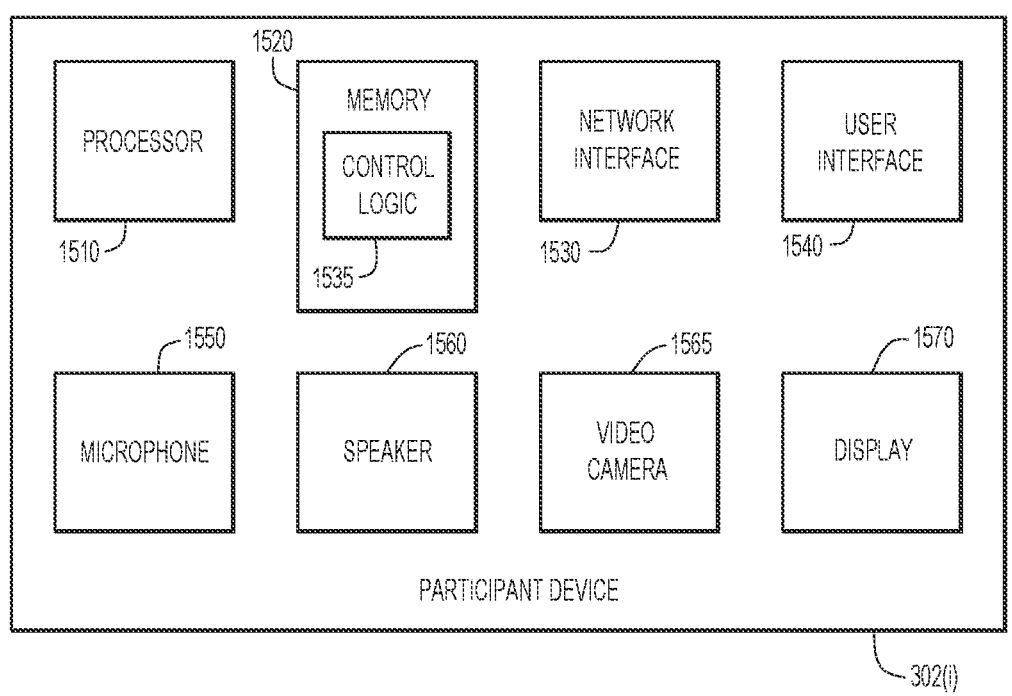
FIG. 15 is a block diagram of a computer device representative of a participant device, according to an example embodiment.

With reference to FIG. 15, there is a block diagram of an example computer device representative of a participant device 302(i). As shown, participant device 302(i) includes a processor 1510, memory 1520 to store a variety of data and software instructions. The processor 1510 is, for example, a microprocessor or microcontroller that executes instructions of control logic 1535 in memory 1520 for implementing the processes described herein. Processor 1510 may include an audio processor component to process audio and an image/video processor component to process images and video. The participant device 302(i) also includes a network interface unit (e.g., card) 1530 to communicate with other devices over a network. Network interface unit 1530 may include an Ethernet card with a port (or multiple such devices) to communicate over wired Ethernet links and/or a wireless communication card with a wireless transceiver to communicate over wireless links.

Participant device 302(i) may further include a user interface unit 1540 to receive input from a user, microphone 1550 and speaker 1560. The user interface unit 1540 may be in the form of a keyboard, mouse and/or a touchscreen user interface to allow for a user of the participant device 302(i) to interface with the device. Microphone 1550 and loudspeaker 1560 enable audio to be recorded and output, respectively. Participant device 302(i) may also include a video camera 1565 to enable the device to record video. Participant device 302(i) may also comprise a display 1570, including, e.g., a touchscreen display, that can display data to a user. In a transmit direction, participant device 302(i) is configured to encode audio and image/video data captured locally (i.e., at the device) into encoded audio and image/video packets, and then transmit the packets to HFU 304. The audio may be audio sensed by microphone 1550. In a receive direction, participant device 302(i) is configured to receive the encoded packets, decode the packets to recover the audio and image/video data therein, and then present the audio and image data locally.

Memory 1520 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1520 may comprise one or more tangible (non-transitory) computer readable storage media (e.g., a memory device) encoded with software comprising computer executable instructions and when the software is executed (by the processor 1510) it is operable to perform the operations described herein. To this end, memory 1520 stores logic 1535 to perform the operations, for example, logic for a producer socket and a consumer socket, and so on. The memory 1520 also stores store data used and generated by logic 1535.

SUMMARY

In summary, in one aspect a method is provided comprising: at a network device configured to distribute audio streams and video streams among participant devices associated with respective users of the participant devices and connected to the network device over a network: collecting respective audio streams from the participant devices; ranking the participant devices based on the respective audio streams collected from the participant devices; based on the ranking, electing top-N participant devices among the participant devices as being associated with respective users who are active speakers, where N is one or more; retrieving respective video streams only from the top-N participant devices; receiving from the participant devices respective requests for video streams from the top-N participant devices; and sending to the participant devices the video streams retrieved only from the top-N participant devices.

In another aspect, an apparatus is provided comprising: network ports configured to send data to and receive data from a network; and a processor coupled to the network ports and configured to distribute audio streams and video streams among participant devices associated with respective users of the participant devices over the network, the processor further configured to: collect respective audio streams from the participant devices; rank the participant devices based on the respective audio streams collected from the participant devices; based on the ranking, elect top-N participant devices among the participant devices as being associated with respective users who are active speakers, where N is one or more; retrieve respective video streams only from the top-N participant devices; receive from the participant devices respective requests for video streams from the top-N participant devices; and send to the participant devices the video streams retrieved only from the top-N participant devices.

In yet another aspect, a non-transitory computer readable medium is provided. The computer readable medium stores instructions that, when executed by a processor of a network device configured to distribute audio streams and video streams among participant devices associated with respective users of the participant devices and connected to the network device over a network, cause the processor/are operable to perform: collecting respective audio streams from the participant devices; ranking the participant devices based on the respective audio streams collected from the participant devices; based on the ranking, electing top-N participant devices among the participant devices as being associated with respective users who are active speakers, where N is one or more; retrieving respective video streams only from the top-N participant devices; receiving from the participant devices respective requests for video streams from the top-N participant devices; and sending to the participant devices the video streams retrieved only from the top-N participant devices.

In another aspect, a method is provided comprising: at a Consumer device configured to send to a Producer device Interests to request data packets of a data stream that are generated at a production rate, each data packet including a name of the data stream, a segment of data, and a current segment number that identifies the data packet in the data stream and that increments as the data packets are generated, the Interests including the name and segment numbers of segments requested by the Interests: synchronizing the segment numbers with the current segment numbers such that (i) once sent, the Interests arrive at the Producer device approximately when the data packets are generated with current segment numbers that match the segment numbers of the Interests, and (ii) a rate for sending the Interests matches the production rate; sending to the Producer device the Interests at the rate for sending the Interests that matches the production rate and with the segment numbers as synchronized, in order to minimize a delay time between when the data packets are generated and when the data packets as generated are/will be received at the Consumer device; and receiving from the Producer device data packets satisfying the Interests.

In yet another aspect, an apparatus is provided comprising: network ports configured to send data to and receive data from a network; and a processor of a Consumer device and coupled to the network ports, the Consumer device configured to send to a Producer device Interests to request data packets of a data stream that are generated at a production rate, each data packet including a name of the data stream, a segment of data, and a current segment number that identifies the data packet in the data stream and that increments as the data packets are generated, the Interests including the name and segment numbers of segments requested by the Interests, the processor configured to: synchronize the segment numbers with the current segment numbers such that (i) once sent, the Interests arrive at the Producer device approximately when the data packets are generated with current segment numbers that match the segment numbers of the Interests, and (ii) a rate for sending the Interests matches the production rate; send to the Producer device the Interests at the rate for sending the Interests that matches the production rate and with the segment numbers as synchronized, in order to minimize a delay time between when the data packets are generated and when the data packets as generated will be received at the Consumer device; and receive from the Producer device data packets satisfying the Interests.

In a further aspect, a non-transitory computer readable medium is provided. The computer readable medium stores instructions that, when executed by a processor of a Consumer device configured to send to a Producer device Interests to request data packets of a data stream that are generated at a production rate, each data packet including a name of the data stream, a segment of data, and a current segment number that identifies the data packet in the data stream and that increments as the data packets are generated, the Interests including the name and segment numbers of segments requested by the Interests, cause the processor/are operable to perform: synchronizing the segment numbers with the current segment numbers such that (i) once sent, the Interests arrive at the Producer device approximately when the data packets are generated with current segment numbers that match the segment numbers of the Interests, and (ii) a rate for sending the Interests matches the production rate; sending to the Producer device the Interests at the rate for sending the Interests that matches the production rate and with the segment numbers as synchronized, in order to minimize a delay time between when the data packets are generated and when the data packets as generated will be received at the Consumer device; and receiving from the Producer device data packets satisfying the Interests.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a network device configured to distribute audio streams and video streams among participant devices connected to the network device over a network:
collecting respective audio streams from the participant devices;
ranking the participant devices based on the respective audio streams collected from the participant devices;
based on ranking, electing top-N participant devices among the participant devices as being associated with respective users who are active speakers, where N is one or more; and
retrieving respective video streams only from the top-N participant devices by:
sending Interests at a sending rate to a particular top-N participant device to request video packets generated by the particular top-N participant device at a production rate, wherein the video packets include current segment numbers that increment as the video packets are generated and the Interests include segment numbers of requested video packets; and
synchronizing the sending rate to the production rate by:
upon receiving each video packet that satisfies an Interest, sending a burst of successive Interests equal in number to a difference between an inFlight number of Interests that have not yet been satisfied and a pending Interest window number of Interests;
adjusting the pending Interest window number of Interests relative to the inFlight number of Interests;
repeating sending the burst of successive Interests and adjusting the burst of successive Interests over time until the sending rate matches the production rate; and synchronizing the segment numbers with the current segment numbers; and by a forwarder of the network device:
receiving, from the participant devices, respective requests for a video stream of the respective video streams from one of the top-N participant devices;
aggregating the respective requests into a single aggregated request for the video stream, and sending the single aggregated request to an application that produces the video stream; and
receiving the video stream from the application, and sending the video stream to the participant devices.

2. The method of claim 1, wherein the forwarder is a Hybrid Information-Centric Networking (hICN) forwarder.

3. The method of claim 1, wherein the ranking includes:
measuring audio power levels of the audio streams collected from the participant devices; and
ranking the participant devices such that higher and lower ranked ones of the participant devices are associated with higher and lower ones of the audio power levels, respectively,
wherein the electing includes electing, as the top-N participant devices, ones of the participant devices associated with top-N highest audio power levels among the audio power levels.

4. The method of claim 1, wherein a respective audio stream from each participant device is segmented into a sequence of audio packets each including a name of the respective audio stream, a segment of audio, and a segment number that identifies the segment and that increments across the sequence, and the collecting the respective audio stream from each participant device includes:
sending to the participant device over the network, audio request Interests that include the name of the respective audio stream and respective segment numbers; and
receiving from the participant device over the network, audio packets that satisfy the Interests, such that the audio packets received from the participant device include the name and respective segment numbers that match the respective segment numbers in the audio request Interests.

5. The method of claim 1, wherein:
the video packets each includes a name of the video stream and a segment of video, wherein each segment number identifies a corresponding segment of video.

6. The method of claim 1, wherein:
sending the Interests includes sending the Interests over an Information Centric Network (ICN); and
receiving includes receiving the video packets from the ICN.

7. The method of claim 1, wherein synchronizing the segment numbers with the current segment numbers causes the Interests, once sent, to arrive at the particular top-N participant device approximately when the video packets having the current segment numbers that match the segment numbers in the Interests are generated.

8. The method of claim 7, wherein synchronizing the segment numbers with the current segment numbers minimizes a delay time between when the video packets are generated and when the video packets as generated are received.

9. The method of claim 1, wherein the video packets each includes a Real-Time Transport Protocol (RTP) packet.

10. An apparatus comprising:
network ports configured to send data to and receive data from a network; and
a processor coupled to the network ports and configured to distribute audio streams and video streams among participant devices over the network, the processor further configured to:
 collect respective audio streams from the participant devices;
 rank the participant devices based on the respective audio streams collected from the participant devices;
 based on ranking, elect top-N participant devices among the participant devices as being associated with respective users who are active speakers, where N is one or more;
 retrieve respective video streams only from the top-N participant devices by:
  sending Interests at a sending rate to a particular top-N participant device to request video packets generated by the particular top-N participant device at a production rate, wherein the video packets include current segment numbers that increment as the video packets are generated and the Interests include segment numbers of requested video packets; and
  synchronize the sending rate to the production rate by:
   upon receiving each video packet that satisfies an Interest, sending a burst of successive Interests equal in number to a difference between an inFlight number of Interests that have not yet been satisfied and a pending Interest window number of Interests;
   adjusting the pending Interest window number of Interests relative to the inFlight number of Interests;
   repeating sending the burst of successive Interests and adjusting the burst of successive Interests over time until the sending rate matches the production rate; and
   synchronizing the segment numbers with the current segment numbers; and
 implement a forwarder configured to:
  receive, from the participant devices, respective requests for a video stream of the respective video streams from one of the top-N participant devices;
  aggregate the respective requests into a single aggregated request for the video stream, and send the single aggregated request to an application that produces the video stream; and
  receive the video stream from the application, and send the video stream to the participant devices.

11. The apparatus of claim 10, wherein the video packets each includes a Real-Time Transport Protocol (RTP) packet.

12. The apparatus of claim 10, wherein:
the processor is configured to rank by:
 measuring audio levels of the audio streams collected from the participant devices; and
 ranking the participant devices such that higher and lower ranked ones of the participant devices are associated with higher and lower ones of the audio levels, respectively; and
the processor is configured to elect by electing as, the top-N participant devices, ones of the participant devices associated with top-N highest audio levels among the audio levels.

13. The apparatus of claim 10, wherein a respective audio stream from each participant device is segmented into a sequence of audio packets each including a name of the respective audio stream, a segment of audio, and a segment number that identifies the segment and that increments across the sequence, and the processor is configured to collect the respective audio stream from each participant device by:
 sending to the participant device over the network, audio request Interests that include the name of the respective audio stream and respective segment numbers; and
 receiving from the participant device over the network, audio packets that satisfy the Interests, such that the audio packets received from the participant device include the name and respective segment numbers that match the respective segment numbers in the audio request Interests.

14. The apparatus of claim 10, wherein:
the video packets each includes a name of the video stream and a segment of video, wherein each segment number identifies a corresponding segment of video.

15. The apparatus of claim 10, wherein:
the processor is configured to send the Interests over an Information Centric Network (ICN); and
the processor is configured to receive the video packets from the ICN.

16. A non-transitory computer readable medium encoded with instructions that, when executed by a processor of a network device configured to distribute audio streams and video streams among participant devices connected to the network device over a network, are operable to perform:
 collecting respective audio streams from the participant devices;
 ranking the participant devices based on the respective audio streams collected from the participant devices;
 based on ranking, electing top-N participant devices among the participant devices as being associated with respective users who are active speakers, where N is one or more;
 retrieving respective video streams only from the top-N participant devices by:
  sending Interests at a sending rate to a particular top-N participant device to request video packets generated by the particular top-N participant device at a production rate, wherein the video packets include current segment numbers that increment as the video packets are generated and the Interests include segment numbers of requested video packets; and
  synchronizing the sending rate to the production rate by:
   upon receiving each video packet that satisfies an Interest, sending a burst of successive Interests equal in number to a difference between an inFlight number of Interests that have not yet been satisfied and a pending Interest window number of Interests;
   adjusting the pending Interest window number of Interests relative to the inFlight number of Interests;
   repeating sending the burst of successive Interests and adjusting the burst of successive Interests over time until the sending rate matches the production rate; and synchronizing the segment numbers with the current segment numbers; and by a forwarder of the network device:

receiving, from the participant devices, respective requests for a video stream of the respective video streams from one of the top-N participant devices;

aggregating the respective requests into a single aggregated request for the video stream, and sending the single aggregated request to an application that produces the video stream; and receiving the video stream from the application, and sending the video stream to the participant devices.

17. The non-transitory computer readable medium of claim 16, wherein the video packets each includes a Real-Time Transport Protocol (RTP) packet.

18. The non-transitory computer readable medium of claim 16, wherein:

the instructions operable to perform the ranking are operable to perform:

measuring audio levels of the audio streams collected from the participant devices; and ranking the participant devices such that higher and lower ranked ones of the participant devices are associated with higher and lower ones of the audio levels, respectively; and the instructions operable to perform the electing are operable to perform electing, as the top-N participant devices, ones of the participant devices associated with top-N highest audio levels among the audio levels.

19. The non-transitory computer readable medium of claim 16, wherein a respective audio stream from each participant device is segmented into a sequence of audio packets each including a name of the respective audio stream, a segment of audio, and a segment number that identifies the segment and that increments across the sequence, and the instructions operable to perform the collecting the respective audio stream from each participant device are operable to perform:

sending to the participant device over the network, audio request Interests that include the name of the respective audio stream and respective segment numbers; and receiving from the participant device over the network, audio packets that satisfy the Interests, such that the audio packets received from the participant device include the name and respective segment numbers that match the respective segment numbers in the audio request Interests.

20. The non-transitory computer readable medium of claim 16, wherein:

the video packets each includes a name of the video stream and a segment of video, wherein each segment number identifies a corresponding segment of video.

* * * * *